(12) United States Patent
Bogaerts et al.

(10) Patent No.: US 11,822,118 B2
(45) Date of Patent: Nov. 21, 2023

(54) INTEGRATED PHOTONIC DEVICE, A SENSOR SYSTEM AND A METHOD

(71) Applicants: IMEC VZW, Leuven (BE); Universiteit Gent, Ghent (BE)

(72) Inventors: Wim Bogaerts, Melle (BE); Wouter Jan Westerveld, Rijswijk (NL); Roelof Jansen, Heverlee (BE)

(73) Assignees: IMEC VZW, Leuven (BE); UNIVERSITEIT GENT, Ghent (BE)

( * ) Notice: Subject to any disclaimer, the term of this patent is extended or adjusted under 35 U.S.C. 154(b) by 0 days.

(21) Appl. No.: 17/851,647

(22) Filed: Jun. 28, 2022

(65) Prior Publication Data
US 2023/0003939 A1    Jan. 5, 2023

(30) Foreign Application Priority Data
Jul. 2, 2021    (EP) ..................................... 21183522

(51) Int. Cl.
G02B 6/12    (2006.01)
G02B 6/42    (2006.01)

(52) U.S. Cl.
CPC ....... *G02B 6/12019* (2013.01); *G02B 6/4215* (2013.01)

(58) Field of Classification Search
None
See application file for complete search history.

(56) References Cited

U.S. PATENT DOCUMENTS

| | | | |
|---|---|---|---|
| 5,414,548 A | * | 5/1995 | Tachikawa .............. H01S 5/026 398/79 |
| 9,588,290 B2 | | 3/2017 | Muñoz et al. |
| 2009/0238513 A1 | | 9/2009 | Hao et al. |

(Continued)

FOREIGN PATENT DOCUMENTS

| EP | 0591042 A1 | 4/1994 |
|---|---|---|
| EP | 3719457 A1 | 10/2020 |

OTHER PUBLICATIONS

Baptista et al: "Wavelength multiplexing of frequency-based self-referenced fiber optic intensity sensors", Optical Engineering, vol. 43, No. 3, 2004, pp. 702-707.

(Continued)

*Primary Examiner* — Jerry Rahll
(74) *Attorney, Agent, or Firm* — MOSER TABOADA

(57) ABSTRACT

An integrated photonic device for wavelength division multiplexing comprises: a wavelength-splitting/combining component configured to be re-used for both splitting a single signal to be split, wherein the signal to be split comprises plural wavelengths, to plural split signals, wherein each of the plural split signals is related to a unique wavelength band, and combining plural signals to be combined, wherein each of the plural signals to be combined is related to a unique wavelength band, to a single combined signal, wherein the wavelength-splitting/combining component comprises at least one output channel for providing an output signal and at least one response channel for receiving a response input signal from a light interaction induced by the output signal, wherein the output channel and the response channel are connected to different ports of the wavelength-splitting/combining component.

13 Claims, 9 Drawing Sheets

(56) References Cited

U.S. PATENT DOCUMENTS

2018/0248632 A1    8/2018  Earnshaw

OTHER PUBLICATIONS

Willshire et al: "An Arrayed Waveguide Grating Based Multiplexer and Interrogator for Fabry-Perot Sensors", IEEE Sensors Journal, vol. 5, No. 5, 2005, pp. 964-969.
Muñoz et al: "Sagnac loop reflector and arrayed waveguide grating-based multi-wavelength laser monolithically integrated on InP", IET Optoelectronics, vol. 5, Iss. 5, 2011, pp. 207-210.
Gargallo et al: "Novel layout for reflective arrayed waveguide gratings based on Sagnac loop reflectors with custom spectral response", arXiv: 1402.4395v1 [physics.optics], 2014, pp. 1-14.
Gargallo et al: "Reflective arrayed waveguide gratings based on Sagnac loop reflectors with custom spectral response", Optics Express, vol. 22, No. 12, 2014, pp. 14348-14362.
Gargallo et al: "Reflective Arrayed Waveguide Grating with Sagnac Loop Reflectors in Silicon-on-Insulator with Gaussian Pass-band", arXiv: 1403.7706v1 [physics.optics], 2014, pp. 1-4.
Extended European Search Report in European Patent Application No. 21183522.8 dated Dec. 23, 2021.

\* cited by examiner

INTEGRATED PHOTONIC DEVICE, A SENSOR SYSTEM AND A METHOD

CROSS REFERENCE TO RELATED APPLICATION

This application claims priority to European Patent Application No. 21183522.8, filed on Jul. 2, 2021, incorporated herein by reference in its entirety.

TECHNICAL FIELD

The present inventive concept relates to an integrated photonic device. In particular, the present inventive concept relates to using the integrated photonic device for wavelength division multiplexing and a sensor system in which such integrated photonic device is incorporated.

BACKGROUND

Optical signals are useful for carrying information. For instance, sensors may be read out using optical signals. In many applications it is undesirable to have electronic connections to sensors and therefore optical signals are advantageously used for carrying information from the sensors. Use of optical signals instead of electronic signals is for instance advantageous in applications where the electronic signals may affect the sensor or the environment in which signals are propagated (such as in a magnetic resonance imaging (MRI) scanner), in applications where heat dissipation from electronic signals needs to be avoided (such as for sensors arranged on skin or in brain tissue), in applications in explosive environments, and in applications in environments with electronic noise.

In an array of sensors, it may be desired that multiple sensors are read out in parallel, which implies that a plurality of optical signals each dedicated to a unique sensor in the array are to be transferred from the array of sensors. However, it may often be desired that the plurality of optical signals is transferred in a single cable (e.g. an optical fiber), such that a lightweight cable may be used and that the arrangement for read-out of the sensors is compact. For instance, use of a single lightweight cable is useful in catheter-based applications.

Wavelength division multiplexing (WDM) allows multiplexing different signals while maintaining integrity of the signals. Thus, WDM may be used to allow multiple signals to be transferred through a single optical fiber and allow the signals to be separated (thanks to the signals using different wavelengths) after having been transferred such that each signal may be separately processed. Using WDM, optical signals for interrogating an array of sensors may be transmitted through a single optical fiber and the response from the array of sensors may also be transmitted back through a single optical fiber. In WDM, the available optical bandwidth is split into wavelength channels and each channel can be used to address an individual sensor.

In a multiplexing set-up, a de-multiplexer is needed for separating the wavelengths of the optical signals that are to interact with respective sensors. Further, a multiplexer is needed for combining the optical signals from the respective sensors. The de-multiplexer and the multiplexer may both be realized as an arrayed waveguide grating (AWG).

The function of the AWG can be inverted. Thus, if the AWG functions as a de-multiplexer to split an optical signal input at a first side of the AWG to a plurality of optical signals of different wavelengths output at a second side of the AWG, the AWG also functions as a multiplexer to combine a plurality of optical signals of different wavelengths input at the second side to a single optical signal output at the first side. This implies that a single optical fiber may be used to transfer an interrogation signal towards an array of sensors. The interrogation signal is then split by the AWG to a plurality of signals that interact with the sensors and are reflected back to the AWG and again combined by the AWG into the single optical fiber. This optical set-up may be called a reflection-mode sensor read-out.

In the reflection-mode sensor read-out light traveling from the AWG in the single optical fiber needs to be separated from light traveling towards the AWG. This may be achieved using an optical circulator. However, the optical circulator is a bulky, expensive component. Further, the reflection-mode sensor read-out may suffer from poor signal-to-noise ratio, because spurious reflections in the set-up may even have a larger amplitude than the light being received back after being modified by the sensor.

According to an alternative, a first AWG may be used as a de-multiplexer to split an optical signal towards an array of sensors. The optical signals may then interact with respective sensors to be modified by the sensors and may then be further passed to a second AWG for combining the optical signals again. This optical set-up may be called a transmission-mode sensor read-out. In this case, there is no confusion between signals traveling towards sensors and from sensors, as the signals are travelling in different optical fibers. However, the first and second AWGs need to be identical such that the wavelength channels are arranged at exactly the same wavelengths. Using silicon photonics, it is very difficult to manufacture two identical AWGs, because even small variations in fabrication process are detrimental to absolute wavelength accuracy of the AWGs.

Different wavelengths of light may also be used in systems wherein spectral information is to be obtained, such as in light detection and ranging (LIDAR) applications. In such cases, an optical beam may be used to scan a scene or an object. A dispersive beamforming element may be used so that different wavelengths are emitted in different directions of the optical beam.

In order to reduce time needed to scan the scene, parallel light sources can be used. The light from these light sources needs to be combined into a single waveguide feeding the beamforming element, and such combination can be done with a first AWG.

It can be desirable to use the same beamforming element to collect radiation being reflected from the scene into a combined signal. Then, the optical signals corresponding to the different light sources need to be separated in order to detect each optical signal separately. This separation can be done with a second AWG. However, if the wavelength channels of the second AWG do not match extremely well with the first AWG, then this will not work successfully.

There is therefore a need of improvement of optical set-ups in wavelength division multiplexing applications.

SUMMARY

An objective of the present inventive concept is to provide an optical arrangement that is suitable for integrated photonic devices and which facilitates use of wavelength division multiplexing.

This and other objectives of the present inventive concept are at least partly met by the invention as defined in the independent claims. Preferred embodiments are set out in the dependent claims.

According to a first aspect, there is provided an integrated photonic device for wavelength division multiplexing, said photonic device comprising: a wavelength-splitting/combining component having a first side and a second side, wherein the wavelength-splitting/combining component is configured to be re-used for both splitting a single signal to be split, wherein the signal to be split comprises plural wavelengths, to plural split signals, wherein each of the plural split signals is related to a unique wavelength band, and combining plural signals to be combined, wherein each of the plural signals to be combined is related to a unique wavelength band, to a single combined signal, wherein the wavelength-splitting/combining component comprises at least one output channel for providing an output signal and at least one response channel for receiving a response input signal from a light interaction induced by the output signal, wherein the output channel and the response channel are connected to different ports of the wavelength-splitting/combining component, and wherein the component comprises at least one additional channel on either the first side or the second side, which additional channel is dedicated to be used only in splitting the single signal to be split or in combining the plural signals to be combined.

Thanks to the set-up according to the first aspect, the same wavelength-splitting/combining component is used both for splitting a signal (de-multiplexing) and for combining plural signals (multiplexing). This implies that the same component is used both for de-multiplexing and multiplexing optical signals. Hence, there is no issue with different components needing to be identical, such that more lenient requirements on accuracy in production of the integrated photonic device is provided.

Further, the use of a single wavelength-splitting/combining component implies that a size of the integrated photonic device may be small such that a size of a chip carrying the integrated photonic device may be reduced.

The use of a single wavelength-splitting/combining component is further advantageous if a response from the integrated photonic device needs to be calibrated or shifted (e.g. to match laser wavelengths), since such calibration or shifting of response of the integrated photonic device is simplified for a single wavelength-splitting/combining component compared to a device comprising two components.

Further, the wavelength-splitting/combining component is set up such that the response input signal is received at a different channel than the output channel through which an output signal was provided. This implies that the response from light interaction induced by the output signal is not reflected back into the same wavelength channel through which the output signal is provided.

The wavelength-splitting/combining component has a reciprocity in its optical function such that if light of a particular wavelength would travel from a particular port on the first side to another particular port on the second side, then light of that wavelength incident on the particular port on the second side would travel back to the corresponding particular port on the first side. Hence, by providing the response input signal in a different port of the wavelength-splitting/combining component, the reciprocity of the photonic device will ensure that an input signal (which generates the output signal(s)) and a response output signal (based on the response input signal) will not interfere with each other. Rather, the input signal and the response output signal will also be provided on different ports of the wavelength-splitting/combining component. This implies that no circulator may be necessary in the set-up in order to separate light traveling from the wavelength-splitting/combining component from light traveling towards the wavelength-splitting/combining component.

The wavelength-splitting/combining component is configured to propagate light incident on the first side to be output on the second side. The wavelength-splitting/combining component could be configured such that the wavelength-splitting/combining component splits a single light signal incident on the first side to plural signals output on the second side and combines plural light signals incident on the second side to a single signal output on the first side. However, the wavelength-splitting/combining component could alternatively be configured such that the wavelength-splitting/combining component splits a single light signal incident on the second side to plural signals output on the first side and combines plural light signals incident on the first side to a single signal output on the second side.

The wavelength-splitting/combining component can be configured such that the output channel and the response channel are both connected to ports at the same side of the wavelength-splitting/combining component, such as being connected to different ports at the second side of the wavelength-splitting/combining component. However, it should be realized that the output channel and the response channel could alternatively be connected to ports at different sides of the wavelength-splitting/combining component. This implies that the wavelength-splitting/combining component could be configured to split a single light signal incident on a first port on the first side to plural split signals output on a first set of ports on the second side and to combine plural light signals incident on a second set of ports on the first side to a single light signal output on a second port on the second side, wherein the ports of the first set of ports differ from the first port and the ports of the second set of ports differ from the second port.

The wavelength-splitting/combining component can be configured to generate a plurality of output signal based on a single input signal, which is split by the wavelength-splitting/combining component into the plurality of output signals. Then, a plurality of response input signals would be provided back to the wavelength-splitting/combining component to be combined by the wavelength-splitting/combining component into a single response output signal. Alternatively, the wavelength-splitting/combining component can be configured to generate a single output signal based on a plurality of input signals, which are combined by the wavelength-splitting/combining component into the single output signals. Then, a single response input signals would be provided back to the wavelength-splitting/combining component to be split by the wavelength-splitting/combining component into a plurality of response output signals. Since the output channel and the response channel are connected to different ports, the response output signal(s) will not be provided on the same port that received the input signal(s). On one of the sides of the wavelength-splitting/combining component, wavelength channels may have a dual function to provide output from the wavelength-splitting/combining component of a first light signal in a first wavelength band and provide input to the wavelength-splitting/combining component of a second light signal in a second wavelength band different from the first wavelength band. Thus, the wavelength channel may be involved both in splitting signals and combining signals by the wavelength-splitting/combining component. However, since the first wavelength band differs from the second wavelength band, signals on the other side of the wavelength-splitting/combining component corresponding to the first light signal and the second light signal would still not be associated with the same channel(s) of the wavelength-splitting/combining component. This implies that at least one additional channel input or output is provided on one of the sides of the wavelength-splitting/combining component, which additional channel is dedicated to either a splitting action or a combining action of the wavelength-splitting/combining component.

As used herein, the phrase "signal to be split comprises plural wavelengths" should be construed as the signal to be split comprising a broadband signal spanning a broad range of wavelengths that may be split into a plurality of narrower wavelength bands or that the signal to be split comprises a signal comprising a plurality of distinct wavelength bands or a combination of the above.

As used herein, the term "unique wavelength band" should be construed such that two wavelength bands being mutually unique may or may not be partially overlapping but may not be completely overlapping.

It should further be realized that the wavelength-splitting/combining component may be configured to function for a set of signals. Thus, the wavelength-splitting/combining component may be configured to interact with plural sets of signals, each set including a unique signal to be split, such that each of the signals to be split may be split to respective plural signals in the respective set of signals. For instance, different ports on the wavelength-splitting/combining components may be dedicated to different sets of signals.

According to an embodiment, the wavelength-splitting/combining component is configured to receive an input signal as the single signal to be split and to split the input signal to a plurality of output signals in a plurality of output channels, wherein the wavelength-splitting/combining component comprises a plurality of response channels for receiving response input signals as the plural signals to be combined, wherein each response channel is configured to receive the response input signal from light interaction induced by a unique output signal, wherein different response channels receive response input signals from light interaction induced by different output signals, and wherein the wavelength-splitting/combining component is configured to combine the plurality of response input signals in the plurality of response channels to a single response output signal.

In this embodiment, a single input signal is split by the wavelength-splitting/combining component and a plurality of response input signals are combined to a single response output signal. Thus, this embodiment is particularly suited for providing signals for interrogating an array of sensors and using wavelength division multiplexing (WDM) for transferring information read-out from the array of sensors in an efficient manner.

In this configuration, the plurality of output signals forms the plural split signals. Further, the single response output signal forms the single combined signal.

According to an embodiment, an output channel of the plurality of output channels is configured to transfer the output signal to a sensor and wherein a response signal from the sensor based on the output signal is received in a response channel.

Hence, the output signal is configured to interact with a sensor in order to generate the response signal, which is provided as a response input signal to the wavelength-splitting/combining component.

Each output channel may be configured to transfer the output signal to a respective sensor in an array of sensors. This implies that responses from sensors in the array of sensors are received in the plurality of response channels.

According to an embodiment, a waveguide is configured to function as both an output channel and a response channel, such that a first output signal of a first wavelength is provided in the waveguide towards a first sensor and a second response input signal from the first sensor or a second sensor based on the response from a second input signal of a second wavelength is provided in the waveguide back towards the wavelength-splitting/combining component.

This implies that the same waveguide may be used both for output signals and response input signals. Since these are provided in different wavelengths, the response output signal provided from the wavelength-splitting/combining component will not interfere with the input signal.

The re-use of the waveguides implies that fewer number of ports may be needed in the wavelength-splitting/combining component for handling the output channels and the response channels, such that the number of ports need not correspond twice the number of sensors from which signals are to be read out. This implies that the integrated photonic device may be compact.

Alternatively, a specific sensor may be interrogated with at least two wavelengths, such that responses based on the first output signal and the second input signal may be provided from the same sensor. This may improve reliability and/or accuracy of read-out from the sensor.

According to an embodiment, the wavelength-splitting/combining component is configured to combine a first set of a plurality of response input signals in a first set of a plurality of response channels to a first, single response output signal and a second set of a plurality of response input signals in a second set of a plurality of response channels to a second, single response output signal.

Thus, all response input signals need not necessarily be combined to a single response output signal. This may allow an improved flexibility in arranging the response channels in relation to the wavelength-splitting/combining component. For instance, the wavelength-splitting/combining component may be configured to properly combine signals if the response input signals are arranged with increasing wavelengths along a sequence of ports of the wavelength-splitting/combining component. By allowing a first set of response channels to be combined to a first response output signal and a second set of response channels to be combined to a second response output signals, the wavelengths of the response channels need not be arranged to continuously increase along ports.

Also, by differentiating between different sets of response input signals, response input signals may be grouped to allow analysis of separate groups of response input signals.

According to an embodiment, the wavelength-splitting/combining component is an arrayed waveguide grating (AWG), or an echelle grating.

The wavelength-splitting/combining component may be a passive optical component providing a multiplexing and corresponding de-multiplexing functionality. This may be achieved in different manners. For instance, the wavelength-splitting/combining component may advantageously be an AWG or an echelle grating.

According to a second aspect, there is provided a sensor system, comprising: the integrated photonic device according to the first aspect, wherein the wavelength-splitting/combining component is configured to receive an input signal as the single signal to be split and to split the input signal to a plurality of output signals in a plurality of output channels, wherein the wavelength-splitting/combining component comprises a plurality of response channels for receiving response input signals as the plural signals to be combined, wherein each response channel is configured to receive the response input signal from light interaction induced by a unique output signal, wherein different response channels receive response input signals from light interaction induced by different output signals, and wherein the wavelength-splitting/combining component is configured to combine the plurality of response input signals in the plurality of response channels to a single response output signal; at least one light source for generating light of a plurality of wavelengths as the input signal; at least one detector for detecting wavelength information in the single response output signal from the wavelength-splitting/combining component; and a sensor comprising a sensor optical waveguide, which is configured to be affected by an external effect such that an optical transmission property of the sensor optical waveguide is changed, whereby light interaction induced by the output signal in the output channel is affected such that the response input signal in the response channel is affected.

Effects and features of this second aspect are largely analogous to those described above in connection with the first aspect. Embodiments mentioned in relation to the first aspect are largely compatible with the second aspect.

The sensor system according to the second aspect allows an array of sensors to be read-out using optical signals, wherein the optical signals can be propagated together to a position close to the sensors and from the position close to the sensors. The wavelength-splitting/combining component may allow de-multiplexing and multiplexing of the optical signals close to the sensors such that the response from each of the sensors may be associated with a respective signal having a unique wavelength band.

Optical signals of the sensor system may thus be combined in optical fibers and WDM may be used for separating the optical signals. Thus, the sensor system is particularly suited for applications wherein a compact system with a lightweight cable is needed, such as in sensor systems to be implemented in catheter-based applications.

Thanks to the wavelength-splitting/combining component, the sensor system can use the same wavelength-splitting/combining component for both de-multiplexing and multiplexing of optical signals to ensure that signals being split into separate wavelength bands can be properly combined again. Still, the sensor system does not require any circulator for differentiating the response output signals from the input signals. Also, the sensor system may detect the response output signals with a high signal-to-noise ratio.

The sensor system may comprise an array of sensors. Each sensor in the array of sensors may be associated with a unique output channel and response channel, such that different output channels and response channels are associated with different sensors in the array of sensors.

The at least one light source may be configured to generate light comprising the plurality of wavelengths. Thus, the at least one light source may generate a broadband signal spanning a broad range of wavelengths that may be split into a plurality of narrower wavelength bands or the at least one light source may generate a signal comprising a plurality of distinct wavelength bands or the at least one light source may generate a signal being a combination of the above.

The at least one light source may be a single broadband light source, such as a broadband laser or light-emitting diode (LED). Alternatively, the at least one light source may comprise a plurality of light sources, such as a plurality of lasers and/or LEDs, wherein each light source in the plurality of light sources is configured to generate a unique wavelength band, wherein light from the plurality of light sources is combined to form the input signal.

The at least one detector is configured to detect the wavelength information of the plurality of wavelengths in the response output signal. This implies that a spectral resolution of the response output signal is detected.

This may be achieved e.g. by the response output signal being dispersed based on wavelengths towards an array of detectors or that detectors in an array of detectors are associated with unique filters, such that each detector in the array of detectors detects a unique wavelength band in the response output signal.

It should further be realized that the detector being configured to detect wavelength information in the single response output signal does not imply that there is necessarily only one response output signal from the wavelength-splitting/combining component. Rather, more than one response output signal may be simultaneously output by the wavelength-splitting/combining component, but each of the response output signals combines a plurality of wavelengths. Further, a single detector or a single array of detectors may detect the wavelength information in plural response output signals. Alternatively, separate detectors or separate arrays of detectors may be used, each being dedicated to a respective response output signal.

The sensor optical waveguide may be configured in any way such as to detect an external effect on the sensor optical waveguide. The sensor optical waveguide may be arranged on a substrate, such as a flexible membrane, such that the external effect being applied to the substrate stretches or contracts a length of the sensor optical waveguide so as to change transmission of light through the sensor optical waveguide. According to an alternative, a refractive index of the sensor optical waveguide or of a medium adjacent to the sensor optical waveguide may be affected by the external effect so as to change transmission of light through the sensor optical waveguide.

The change of optical transmission property of the sensor optical waveguide may cause an optical signal through the sensor optical waveguide to be modulated for allowing detection of the external effect. Alternatively, the change of optical transmission property of the sensor optical waveguide may affect coupling of light from another optical waveguide into the sensor optical waveguide such that light propagating in the other optical waveguide will be affected in dependence of the optical transmission property of the sensor optical waveguide.

The output signal from the wavelength-splitting/combining component may be directly affected in the sensor optical waveguide so as to form the response input signal. Alternatively, the output signal from the wavelength-splitting/combining component may be at least partly coupled into the sensor optical waveguide or the output signal may interact with a separate optical signal in the sensor optical waveguide so as to form the response input signal.

The external effect may for instance be a temperature, a force, such as a force due to sound vibration, an incident light, or a presence of a substance (changing a refractive index).

According to an embodiment, the sensor optical waveguide may be arranged as a closed-loop resonator such that an external effect being applied on the closed-loop resonator affects a resonance wavelength of the closed-loop resonator.

According to an embodiment, the integrated photonic device and the sensor are configured such that the response input signal corresponds to light passing the sensor once to form a transmission-mode sensor.

This implies that the integrated photonic device and the sensor are configured such that light from light interaction induced by an output signal is further transmitted from the sensor and not reflected back by the sensor into the same waveguide channel from which the output signal was provided.

Thanks to the sensor system providing a transmission-mode sensor, a high signal-to-noise ratio may be provided, since any spurious reflections in sensor system set-up will not affect the response output signal to be detected.

According to an embodiment, an optical waveguide has a first portion extending from the wavelength-splitting/combining component to the sensor forming the output channel and a second portion connected to the first portion and extending back from the sensor to the wavelength-splitting/combining component forming the response channel.

This implies that a single optical waveguide may provide a light path from the wavelength-splitting/combining component to the sensor and from the sensor back to the wavelength-splitting/combining component. The single optical waveguide is thus associated with two different ports on the wavelength-splitting/combining component.

The single optical waveguide may define any path between the two ports of the wavelength-splitting/combining component, such as the optical waveguide being bent at a location of the sensor.

According to an alternative embodiment, the output channel and the response channel are arranged at different locations in relation to the sensor optical waveguide.

This implies that the output signal may be transferred in a first optical waveguide from the wavelength-splitting/combining component to the sensor and the response input signal may be transferred in a second optical waveguide, distinct from the first optical waveguide, from the sensor to the wavelength-splitting/combining component. Thus, the output signal in the first optical waveguide may induce light interaction which affects a signal propagating in the second optical waveguide.

According to an embodiment, the sensor is an opto-mechanical ultrasound sensor (OMUS).

Thus, the sensor system may be configured to provide photo-acoustic imaging by detecting ultrasound through light-based read-out from sensors. Photo-acoustic imaging allows imaging deep into tissue so as to be particularly suited for imaging in e.g. brain tissue. The ultrasound waves may have a weak intensity and may therefore require high sensitivity in detection.

Thanks to the sensor system allowing sensor read-out with a high signal-to-noise ratio through a compact system, the sensor system may be particularly suited for the sensor being an opto-mechanical ultrasound sensor.

According to a third aspect, there is provided a sensor system, comprising: the integrated photonic device according to the first aspect, wherein the wavelength-splitting/combining component is configured to receive a plurality of input signals as the plural signals to be combined and to combine the plurality of input signals to a single output signal in a single output channel, wherein the wavelength-splitting/combining component comprises a single response channel for receiving a response input signal as the single signal to be split, and wherein the wavelength-splitting/combining component is configured to split the response input signal in the response channel to a plurality of response output signals, at least one light source for generating light of a plurality of wavelengths as the plurality of input signals; wavelength-separating and capturing element for separating wavelengths of the output signal for spectral emission towards a scene and for capturing spectral information from the scene, wherein the wavelength-separating and capturing element receives the output signal in the output channel and provides the response input signal of the response channel; and at least one detector for detecting wavelength information in the plurality of response output signals of the wavelength-splitting/combining component.

Effects and features of this third aspect are largely analogous to those described above in connection with the first and second aspects. Embodiments mentioned in relation to the first and second aspects are largely compatible with the third aspect.

The sensor system according to the second embodiment allows optical signals to be propagated together to a wavelength-separating and capturing element and response signals to propagated together back from the wavelength-separating and capturing element. Thus, a combined output signal from the wavelength-splitting/combining component may be provided to the wavelength-separating and capturing element, such that a scene may be scanned for several wavelengths simultaneously to enable quickly obtaining spectrally resolved information of the scene.

Thanks to the wavelength-splitting/combining component, the sensor system of the third aspect can use the same wavelength-splitting/combining component for both multi-plexing and de-multiplexing of optical signals to ensure that signals being combined for propagation to the wavelength-separating and capturing element can be properly split again to respective wavelength bands. Still, the sensor system does not require any circulator for differentiating the response output signals from the input signals. Also, the sensor system may detect the response output signals with a high signal-to-noise ratio.

The sensor system according to the third aspect may for instance be used in a light detection and ranging (LIDAR) applications or in any other application where a dispersive beamforming element is used for emitting wavelengths towards a target.

The sensor system allows spectral resolution of the target or scene to be provided in the response captured by wavelength-separating and capturing element. Thanks to the WDM provided by the optical signals to and from the wavelength-splitting/combining component, spectrally resolved information may be carried in single optical signals to and from the wavelength-separating and capturing element.

The wavelength-separating and capturing element may be a single optical element for separating wavelengths towards a scene and for capturing responses from the scene. Alternatively, separate optical elements may be used, such that one element is dedicated to wavelength separation towards the scene and another element is dedicated to capturing responses from the scene.

The at least one light source may be configured to generate light comprising the plurality of wavelengths. Thus, the at least one light source may generate a broadband signal spanning a broad range of wavelengths that may be split into a plurality of narrower wavelength bands or the at least one light source may generate a signal comprising a plurality of distinct wavelength bands or the at least one light source may generate a signal being a combination of the above. The light from the at least one light source may be properly split into wavelength bands of interest before reaching the wavelength-splitting/combining component.

The at least one light source may be a single broadband light source, such as a broadband laser or light-emitting diode (LED). Alternatively, the at least one light source may comprise a plurality of light sources, such as a plurality of lasers and/or LEDs, wherein each light source in the plurality of light sources is configured to generate a unique wavelength band, wherein light from the plurality of light sources is combined to form the input signal. Advantageously, the sensor system comprises a plurality of light sources dedicated to respective wavelength bands.

The at least one detector is configured to detect the wavelength information of the plurality of wavelengths in the response output signals. This may be achieved e.g. by each of the response output signals being associated with a respective detector.

According to an embodiment, the sensor system comprises a plurality of light sources, each configured to generate light of a unique wavelength band, and a plurality of detectors, each configured to detect a single response output signal.

This implies that each light source may be adapted to provide a well-defined wavelength band. Further, each detector may be configured to detect a single response output signal, such that the response output signals may be transferred directly to the respective detectors. Hence, the sensor system may provide high quality detection of spectral information from the scene.

According to an embodiment, each light source is associated with a guiding element for guiding part of the generated light directly to a detector, enabling mixing of generated light from the light source with light in the single response output signal for frequency-modulated continuous wave (FMCW) detection.

Thanks to the guiding element the input signal from the light source may be mixed with the response output signal for the same wavelength band. This implies that the input signal and the response output signal may be related to each other. The use of multiple wavelengths in multiple input signals and response output signals thus enables FMCW detection, which may be used e.g. for determining a distance to a target within the scene.

The guiding element may for instance use a beam-splitting element, such as a beam splitter mirror, for transferring part of a signal towards the wavelength-splitting/combining component and part of the signal towards the detector.

According to an embodiment, the sensor system further comprises a power distribution device comprising a multi-mode interferometer between the wavelength-splitting/combining component and the wavelength-separating and capturing element.

The power distribution device may enable an output signal from the wavelength-splitting/combining component towards the wavelength-separating and capturing element and a response signal from the wavelength-separating and capturing element towards the wavelength-splitting/combining component to be provided in a single waveguide. The power distribution device may thus separate the output signal from the response signal, such that the response signal may be provided into the wavelength-splitting/combining component in a response channel, wherein the output channel and the response channel are connected to different ports of the wavelength-splitting/combining component.

The power distribution device may advantageously be provided as a multimode interferometer, such as a 1×2 multimode interferometer. According to an alternative, a circulator may be used.

According to a fourth aspect, there is provided a method for wavelength division multiplexing, said method comprising: using a single wavelength-splitting/combining component for both splitting a single signal to be split, wherein the signal to be split comprises plural wavelengths, to plural split signals, and combining plural signals to be combined to a single combined signal, said method comprising either: receiving an input signal as the single signal to be split; splitting the input signal by the wavelength-splitting/combining component to a plurality of output signals in a plurality of output channels, wherein the input signal comprises plural wavelengths and each output signal is related to a unique wavelength band, receiving response input signals in a plurality of response channels as the plural signals to be combined, wherein each response channel is configured to receive the response input signal from light interaction induced by a unique output signal, wherein different response channels receive response input signals from light interaction induced by different output signals; and combining the plurality of response input signals to a single response output signal, wherein each response input signal is related to a unique wavelength band, or receiving a plurality of input signals as the plural signals to be combined; combining the plurality of input signals to a single output signal in an output channel, wherein each input signal is related to a unique wavelength band, receiving a response input signals in a single response channel as the single signal to be split, wherein the response channel is configured to receive the response input signal from light interaction induced by the single output signal; and splitting the response input signal to a plurality of response output signals, wherein the response input signal comprises plural wavelengths and each response output signal is related to a unique wavelength band; wherein the output channel and the response channel are connected to different ports of the wavelength-splitting/combining component.

Effects and features of this fourth aspect are largely analogous to those described above in connection with the first, second, and third aspects. Embodiments mentioned in relation to the first, second, and third aspects are largely compatible with the fourth aspect.

The method allows the same wavelength-splitting/combining component to be used for de-multiplexing and multiplexing signals. Thanks to output channel(s) and response channel(s) being connected to different ports of the wavelength-splitting/combining component, the wavelength-splitting/combining component may be re-used for de-multiplexing and multiplexing while enabling the input signal(s) to be separate from the response output signal(s). Hence, no complicated components are needed for separating input signal(s) from response output signal(s) and a high signal-to-noise ratio of the response output signal(s) may be provided.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

Figure 1:
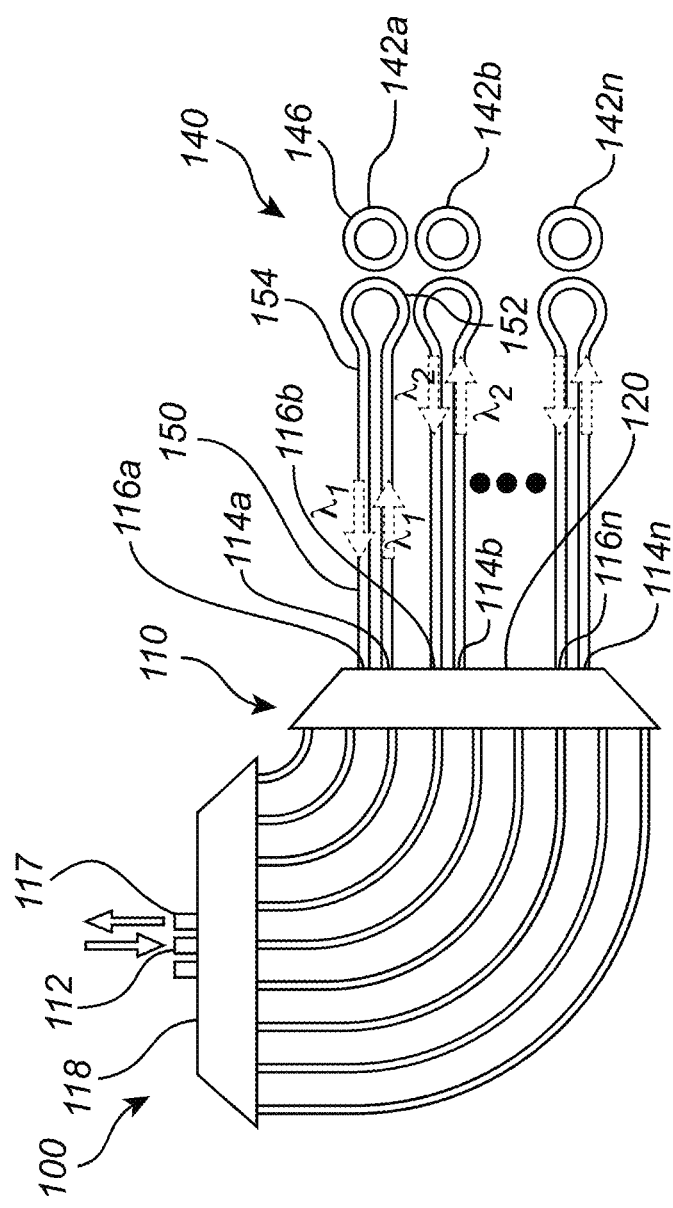
FIG. 1 is a schematic view of an integrated photonic device according to a first embodiment.

Referring now to FIG. 1, a photonic device 100 according to an embodiment will be described. The photonic device 100 is suited for being arranged as an integrated photonic device 100, wherein the photonic device 100 is formed by being patterned on a substrate, such as a semiconductor substrate. This is advantageous in forming a miniaturized photonic device. For instance, the integrated photonic device 100 may be formed in silicon on a silicon-on-insulator substrate, which facilitates use of semiconductor manufacturing technology for forming the integrated photonic device 100.

The integrated photonic device 100 comprises a wavelength-splitting/combining component 110. The wavelength-splitting/combining component 110 is configured such that an optical signal comprising a plurality of wavelengths input into the wavelength-splitting/combining component are split into a plurality of optical signals, wherein each of the plurality of optical signals is related to a unique wavelength band.

The wavelength-splitting/combining component 110 further has a reciprocal functionality such that the wavelength-splitting/combining component 110 also is configured such that a plurality of optical signals related to unique wavelength bands are combined by the wavelength-splitting/combining component 110 to a single optical signal.

The wavelength-splitting/combining component 110 shown in FIG. 1 comprises a first input channel, which is configured to receive an input optical signal to be split, the input optical signal being input at a first input port 112 of the wavelength-splitting/combining component 110. The wavelength-splitting/combining component 110 is further configured to output a plurality of output optical signals at a plurality of output channels, wherein the output channels are provided at a set of output ports 114a, 114b, ..., 114n of the wavelength-splitting/combining component 110.

The output signal in a first output channel provided at a first output port 114a may be light in a first wavelength band, $\lambda_1$, whereas the output signal in a second output channel provided at a second output port 114b may be light in a second wavelength band, $\lambda_2$, and so forth. The wavelength bands, $\lambda_1, \lambda_2, \ldots, \lambda_n$, may have an increasing wavelength along a line extending between the output ports 114a, 114b, ..., 114n.

Due to reciprocity of the wavelength-splitting/combining component 110, if light in the first wavelength band, $\lambda_1$, is input to the wavelength-splitting/combining component 110 at the first output port 114a, the light will be output at the first input port 112. Further, if light in the first wavelength band, $\lambda_2$, is input to the wavelength-splitting/combining component 110 at the second output port 114b, the light will also be output at the first input port 112, being combined with the light input at the first output port 114a. In such case, light of a particular wavelength having been split by the wavelength-splitting/combining component 110 being returned to the same port of the wavelength-splitting/combining component 110 in order for the light to be combined by the wavelength-splitting/combining component 110 will be combined to the same port 112 at which light was initially input. This implies that input light is mixed with response light. The same applies if the wavelength-splitting/combining component 110 is configured to receive a plurality of input signals to be combined, each having a unique wavelength band, at a plurality of input ports such as to output a single combined signal at an output port. Light being returned to the same port (the output port) of the wavelength-splitting/combining component 110 in order for the light to be split by the wavelength-splitting/combining component 110 will be split to the same input ports at which light was initially input. Again, this implies that input light is mixed with response light.

According to the inventive concept, light being returned to the wavelength-splitting/combining component 110 will not be returned to the port at which light was output from the wavelength-splitting/combining component 110. Rather, the light that is output from the wavelength-splitting/combining component 110, the output optical signal, after going through a light interaction to form a response from the output signal, will be returned as a response input signal to the wavelength-splitting/combining component 110 at a port differing from the output port (ports 114a, 114b, ..., 114n in FIG. 1).

The wavelength-splitting/combining component 110 receives the response input signal in a response channel and outputs a response output signal in a response output channel. The response input signal is received at a response input port and the response output signal is provided at a response output port. Since the wavelength-splitting/combining component 110 receives the response input signal of a particular wavelength at a response input port which differs from the output port for the particular wavelength, the response output signal will be output at a response output port which differs from the corresponding input port of the wavelength-splitting/combining component 110.

In the embodiment of FIG. 1, the response input signals are received at a set of response input ports 116a, 116b, ..., 116n. The response input signal in a first response channel provided at a first response input port 116a may be light in the first wavelength band, $\lambda_1$, corresponding to the first wavelength band of the output signal provided at the first output port 114a. The response input signal in a second response channel provided at a second response input port 116b may be light in the second wavelength band, $\lambda_2$, corresponding to the second wavelength band of the output signal provided at the second output port 114a. As can be seen in FIG. 1, the set of output ports 114a, 114b, ..., 114n and the set of response input ports 116a, 116, ..., 116n, may be interleaved such that the output ports are separate from the response input ports. A location at which optical signals of particular wavelengths are output from the wavelength-splitting/combining component 110 is thus shifted in relation to a location at which return optical signals of the particular wavelengths are input to the wavelength-splitting/combining component 110.

Thanks to this arrangement of the wavelength-splitting/combining component 110 in the integrated photonic device 100, response output signals will not be mixed with input signals. This implies that the wavelength-splitting/combining component 110 may be re-used for both splitting and combining optical signals, such that it may be ensured that the wavelength-depending properties of the wavelength-splitting/combining component 110 is the same in both splitting and combining optical signals and there is no need of manufacturing two separate components 110 with identical properties. Further, the integrated photonic device 100 physically separates input signals from response output signals such that there is no need for complicated device(s) for separating input signals from the response output signals.

In the embodiment of FIG. 1, the wavelength-splitting/combining component 110 is shown as being used first as a de-multiplexer in order to split the input signal to a plurality of output signals and then as a multiplexer in order to combine a plurality of response input signals to a combined response output signal. However, it should be realized that in other embodiments, as further described below, the wavelength-splitting/combining component 110 may be used first as a multiplexer in order to combine a plurality of input signals into a combined output signal and then as a de-multiplexer in order to split a response input signal into a plurality of response output signals.

The integrated photonic device 100 is useful in any type of transfer of optical signals. However, the integrated photonic device 100 is particularly useful in applications wherein there is a need for a compact system and/or a need for reducing an amount of cables and/or optical fibers for transporting optical signals. This is the case for instance in any catheter-based application, wherein an optical signal is to be provided to and from a position in a body of a human or animal subject. In order to ensure that a size of the catheter can be as small as possible, the optical signals may be transferred into the catheter through a single optical fiber and out of the catheter through another single optical fiber. The wavelength-splitting/combining component 110 may be used in the catheter to split an input signal to allow using different optical signals, e.g. for reading out sensor values from an array of sensors, and to combine the response signals for transferring a multiplexed signal back out of the catheter.

A reduced amount of optical fibers may also be beneficial when signals are to be transferred along a long path, such as when it is not possible to provide a plurality of light sources close to a location wherein a plurality of wavelengths are to be used for illuminating a target or scene. This may be the case in a LIDAR setting, wherein a plurality of optical signals may be combined by the wavelength-splitting/combining component at a position close to a plurality of lasers such that a multiplexed optical signal may be transferred to a beamforming element. Response signals may then again be transferred back for detection in a multiplexed optical signal, which may be split by the wavelength-splitting/combining component 110 for separate detection of the wavelengths.

As shown in FIG. 1, the wavelength-splitting/combining component 110 may be configured to receive the input signal to be split at a first side 118 and provide the plurality of output signals at a second side 120. The wavelength-splitting/combining component 110 may further be configured to receive the plurality of response input signals to be combined at the second side 120 and to provide the combined response output signal at the first side 118. Thus, a reversed path between the first and the second sides 118, 120 of the wavelength-splitting/combining component 110 may be used for splitting/combining of optical signals. However, this is not necessarily the case. Rather, according to an alternative embodiment, the wavelength-splitting/combining component 110 may be configured to receive the input signal to be split at the first side 118 and provide the plurality of output signals at the second side 120 and the wavelength-splitting/combining component may further be configured to receive also the plurality of response input signals to be combined at the first side 118 and to provide the combined response output signal at the second side 120.

As used herein, the terms input channel, output channel, and response channel should be construed as channels through which signals are guided to be input to and output from the wavelength-splitting/combining component 110. It should be realized that the channels may be associated with waveguides for confining the signals but need not necessarily be associated with such waveguides. The terms input port, output port, response input port, and response output port should be construed as a physical interface at which input signals and output signals are connected into and out of the input channels, output channels and response channels of the wavelength-splitting/combining component 110.

As described above, the wavelength-splitting/combining component 110 is configured such that the wavelength-splitting/combining component 110 receives the response input signal of a particular wavelength at a response input port which differs from the output port for the particular wavelength, the response output signal will be output at a response output port which differs from the corresponding input port of the wavelength-splitting/combining component 110. This also implies that at least one channel in the wavelength-splitting/combining component 110 is dedicated to being used only in splitting an optical signal or in combining optical signals. In this respect, such at least one channel in the wavelength-splitting/combining component 110 is referred to as an "additional channel", since it is not used in the dual functionality of the wavelength-splitting/combining component 110. It should be realized that none of the channels in the wavelength-splitting/combining component 110 need be used in both splitting and combining of optical signals. However, some of the channels may be used in both splitting and combining of optical signals.

The wavelength-splitting/combining component 110 may be any type of optical component that is configured to split an optical signal based on wavelengths of the optical signal. In comparison to a prism or another wavelength-dispersive element, the wavelength-splitting/combining component 110 also comprises waveguides for arranging the plurality of optical signals of different wavelengths in a discrete number of optical channels.

In any of the embodiments of the photonic integrated device 100, the wavelength-splitting/combining component 110 may be an arrayed waveguide grating (AWG). In the following, the wavelength-splitting/combining component 110 will be referred to as an AWG, but it should be realized that other types of optical components may be used for achieving the wavelength-splitting/combining component 110, such as an echelle grating.

Figure 2:
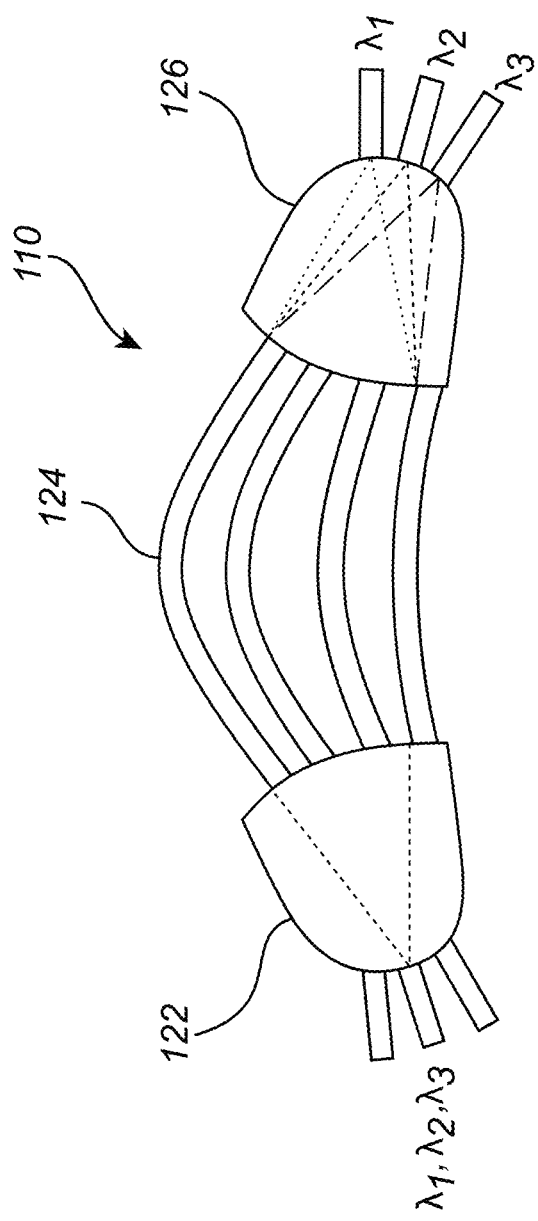
FIG. 2 is a schematic view of a wavelength-splitting/combining component of the integrated photonic device according to a first embodiment.

According to an embodiment, as shown in FIG. 2, the AWG 110 comprises an input star coupler 122, an array of waveguides 124 and an output star coupler 126. Light enters the input star coupler 122 through an input aperture. Light is diffracted at the input aperture and propagates through the input star coupler 122 (forming a free propagation region) such that light is split between the waveguides of the array of waveguides 124 being connected to output apertures of the input star coupler 122.

The waveguides have input ends connected to the input star coupler 122 and output ends connected to the output star coupler 126. The waveguides in the array of waveguides 124 are designed to have a linearly increasing length. Light in the different waveguides experiences different travel distances and waveguide dispersion leading to a phase difference of light in different waveguides at the output ends of the waveguides.

Upon entering the output star coupler 126, light is again diffracted and then propagated through the output star coupler 126 (forming a free propagating region). The phase differences are designed such that phase fronts of different wavelengths get focused at different focal points, which are associated with further waveguides. The signals at the further waveguides are thus separated into different wavelengths such that the optical signal input at the input star coupler 122 is split into a plurality of output signals of different wavelength bands being output at the output star coupler 126.

Returning again to FIG. 1, the AWG 110 shown therein is configured to receive an input signal as the single signal to be split and to split the input signal to a plurality of output signals in a plurality of output channels, wherein the AWG 110 comprises a plurality of response channels for receiving response input signals as the plural signals to be combined. Each response channel is configured to receive the response input signal from light interaction induced by a unique output signal and different response channels receive response input signals from light interaction induced by different output signals. The AWG 110 is configured to combine the plurality of response input signals in the plurality of response channels to a single response output signal.

The light interaction induced by the unique output signal may be any type of light interaction, such as transmission, absorption, scattering or reflection of the output signal, or interference of the output signal with another light signal. The output signal may thus be modulated by the light interaction so as to change an intensity (amplitude) and/or phase of the output signal. The light interaction generates a response signal which is provided back to the AWG 110.

In the embodiment shown in FIG. 1, the integrated photonic device 100 is configured to transfer the output signal from each output channel to a respective sensor 142a, 142b, . . . , 142n of an array 140 of sensors. The sensors 142a, 142b, . . . , 142n may be configured to receive an external effect, such that an optical transmission property of the sensor is changed, whereby light interaction induced by the output signal in the output channel is affected such that the response input signal in the response channel is affected. For instance, the sensor may comprise an optical waveguide, wherein the external effect changes the optical transmission property of the sensor such that the external effect may be detected in terms of a quantity of light interaction with the output signal from the AWG 110.

Thanks to the use of a plurality of wavelengths, i.e. that each output signal has a unique wavelength band, each sensor may be read out using a unique wavelength band. This allows the response input signals to be combined for combined transfer of the signals from the array 140 of sensors to e.g. a processing unit for further analysis of the signals. Wavelength-division multiplexing (WDM) is thus used for differentiating between measurements from different individual sensors 142a, 142b, . . . , 142n and individual measurement results may later be determined by analyzing wavelength content of the combined response output signal.

As illustrated in FIG. 1, the set of output ports 114a, 114b, . . . , 114n is disjoint from the set of response input ports 116a, 116, . . . , 116n. Pairs of ports are formed such that each pair includes one output port and one response input port. For instance, output port 114a and response input port 116a form a pair, such that the output signal of the first wavelength λi provided at the first output port 114a generates the response input signal of the same first wavelength λ1, which response input signal is provided at the response input port 116a. The output ports 114a, 114b, . . . , 114n are arranged interleaved with the response input ports 116a, 116b, . . . , 116n such that the ports in each pair are arranged adjacent to each other. However, it should be understood that the output ports 114a, 114b, . . . , 114n and the response input ports 116a, 116b, . . . , 116n may be arranged in other configurations such as being grouped together in two groups of ports that are physically separated.

Since the output signal with a particular wavelength is not provided in the same location in relation to the AWG 110 as the response input signal of the same wavelength, the response output signal (formed by combining the response input signals) will not be provided in the same location in relation to the AWG 110 as the input signal. Thus, the AWG 110 comprises a response output port 117, which is arranged in a different physical location from the input port 112. The response input ports 116a, 116b, . . . , 116n are arranged in relation to the AWG 110 such that the response input signals of different wavelengths will be combined by the AWG 110 to a single response output signal. In this respect, the physical interrelationship between different output ports 114a, 114b, . . . , 114n, for output signals of different wavelengths may need to be the same as the physical interrelationship between different response input ports 116a, 116b, . . . , 116n for response input signals of corresponding different wavelengths.

Figure 3:
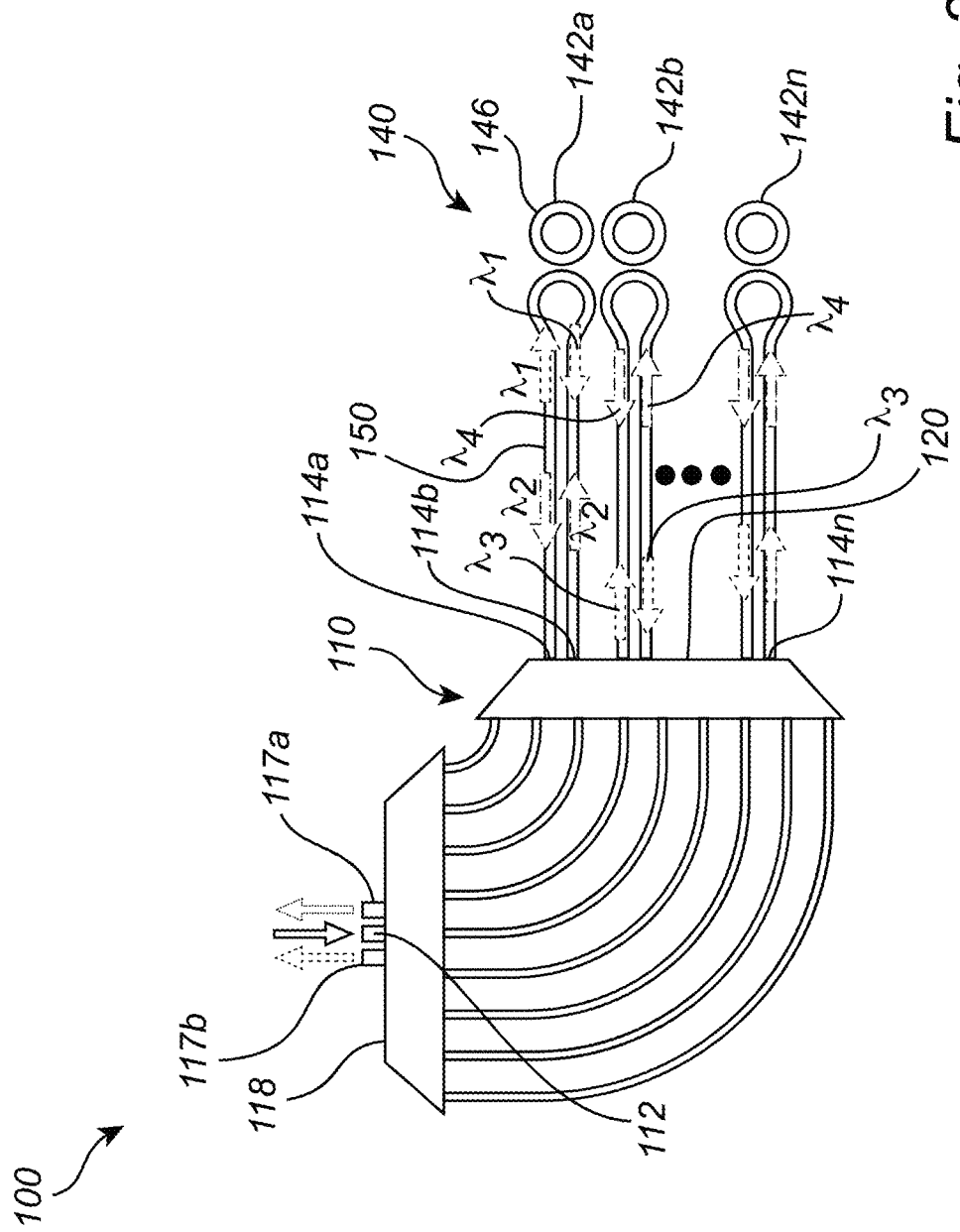
FIG. 3 is a schematic view of the integrated photonic device according to a second embodiment.

Referring now to FIG. 3, it should be realized that a waveguide 130 of the AWG 110 may be configured to function as both an output channel and a response channel. The AWG 110 of FIG. 3 could be identical to the AWG 110 of FIG. 1 and the only difference could be how output signals and response signals are connected to be output from and input to the AWG 110.

The first output channel of the AWG 110 may output the first output signal of the first wavelength $\lambda_1$, and the second output channel of the AWG 110 may output the second output signal of the second wavelength $\lambda_2$. The first response input signal of the first wavelength $\lambda_1$ based on the first output signal may be input to the AWG 110 in the second output channel. Thus, the waveguide of the second output channel functions as an output channel for output of the second output signal of the second wavelength $\lambda_2$, and also functions as a response channel for input of the first response input signal of the first wavelength $\lambda_1$.

Further, a third output channel of the AWG 110 may output a third output signal of a third wavelength $\lambda_3$. The second response input signal of the second wavelength $\lambda_2$ based on the second output signal may be input to the AWG 110 in the third output channel. In this manner, the response input signals may be shifted throughout the waveguides of the AWG 110 such that the response input signal is provided in the waveguide adjacent to the waveguide through which the corresponding output signal is provided. In this manner, an efficient use of the waveguides of the AWG 110 is achieved, since waveguides may have dual functions being involved in both splitting and combining of signals.

Alternatively, as illustrated in FIG. 3, output channels are associated in pairs such that the response channels corresponding to the output channels in the pair are cross-wise provided in the waveguides of the output channels.

Thus, the waveguide of the second output channel functions as an output channel for output of the second output signal of the second wavelength $\lambda_2$, and also functions as a response channel for input of the first response input signal of the first wavelength $\lambda_1$. Further, the waveguide of the first output channel functions as an output channel for output of the first output signal of the first wavelength $\lambda_1$, and also functions as a response channel for input of the second response input signal of the second wavelength $\lambda_2$. In this embodiment, each sensor 142a, 142b, ..., 142n may be interrogated by two output signals, which may provide an improved reliability in read-out of sensor measurements.

In the set-up in FIG. 3, the physical interrelationship for response channels configured to receive response input signals of alternate wavelengths among an entire set of wavelengths may be the same as the physical interrelationship between the output channels for corresponding different wavelengths. Thus, the response input signals of alternate wavelengths $\lambda_1, \lambda_3, \ldots$ may be combined by the AWG 110 at a first response output port 117a. Further, the response input signals of the other alternate wavelengths $\lambda_2, \lambda_4, \ldots$ may be combined by the AWG 110 at a first response output port 117b.

It should be realized that the AWG 110 may comprise a plurality of response output ports in other embodiments as well such that different combined response output signals may be provided at different response output ports. Thus, the AWG 110 may be configured to combine a first set of a plurality of response input signals in a first set of a plurality of response channels to a first, single response output signal and a second set of a plurality of response input signals in a second set of a plurality of response channels to a second, single response output signal.

Referring again to FIG. 1, the integrated photonic device 100 may further comprise optical waveguides 150 for guiding optical signals between the AWG 110 and the array 140 of sensors. Each optical waveguide 150 may comprise a first portion 152 extending from an output port (e.g. the first output port 114a) to a sensor (e.g. a first sensor 142a) in the array 140 and a second portion 154 extending from the sensor 142a to a response input port (e.g. the first response input port 116a) of the AWG 110. The first portion 152 and the second portion 154 may be connected such that a single optical waveguide 150 extends between the output port 114a and the response input port 116a.

The optical waveguide 150 may be arranged in relation to the sensor 142a such that an optical signal propagating through the optical waveguide 150 is affected by the sensor 142a. For instance, the sensor 142a may comprise a sensor optical waveguide 146, which is configured to be affected by an external effect such that an optical transmission property of the sensor optical waveguide 146 is changed. The optical waveguide 150 and the sensor optical waveguide 146 may be arranged such that an optical signal propagating in the optical waveguide 150 may be at least partly coupled into the sensor optical waveguide 146, wherein the coupling of light between the optical waveguide 150 and the sensor optical waveguide 146 may be affected by an external effect acting on the sensor 142a.

For instance, the sensor optical waveguide 146 may be configured as a closed-loop resonator such that an external effect being applied on the closed-loop resonator affects a resonance wavelength of the closed-loop resonator. This implies that if the resonance wavelength corresponds well with the wavelength of light propagating in the optical waveguide 150, a large portion of the optical signal in the optical waveguide 150 will be coupled into the closed-loop resonator and intensity of the response input signal in the optical waveguide 150 will be decreased to a large extent by the coupling of light into the sensor optical waveguide 146.

The response input signal may thus be affected in dependence of the coupling of light between the optical waveguide 150 and the sensor optical waveguide 146.

Since the integrated photonic device 100 and the sensor 142a are configured such that light from light interaction induced by the output signal is further transmitted from the sensor 142a and not reflected back by the sensor 142a, the integrated photonic device 100 may be considered to acquire response input signals in a transmission-mode of the sensor 142a.

Figure 4:
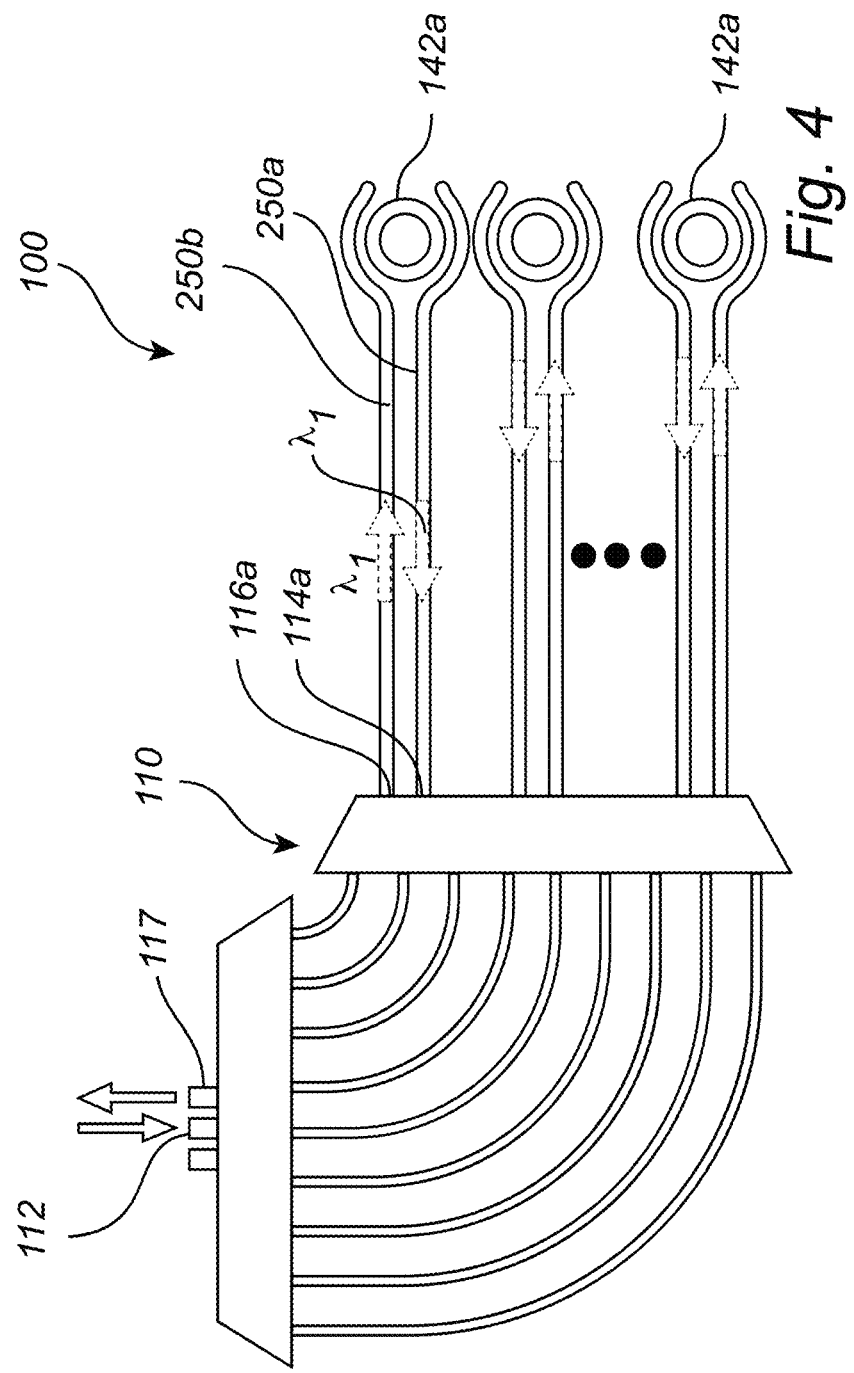
FIG. 4 is a schematic view of the integrated photonic device according to a third embodiment.

Referring now to FIG. 4, an alternative embodiment for providing a transmission-mode of the sensor 142a will be described.

In the embodiment shown in FIG. 4, two different optical waveguides are associated with the output port 114a and the response input port 116a, respectively. Thus, the integrated photonic device 100 comprises a first optical waveguide 250a extending from the output port 114a of the AWG 110 to the sensor 142a and a second optical waveguide 250b extending from the sensor 142a to the response input port 116a of the AWG 110.

According to the embodiment of FIG. 4, the output signal propagating in the first optical waveguide 250a can be coupled to the sensor optical waveguide 146 and the signal can be further coupled from the sensor optical waveguide 146 to the second optical waveguide 250b.

Again, the sensor optical waveguide 146 may be configured as a closed-loop resonator such that an external effect being applied on the closed-loop resonator affects a resonance wavelength of the closed-loop resonator. This implies that if the resonance wavelength corresponds well with the wavelength of light propagating in the first optical waveguide 250a, a large portion of the optical signal in the first optical waveguide 250a will be coupled into the closed-loop resonator and hence a large portion of the optical signal in the first optical waveguide 250a will be coupled into the second optical waveguide 250b, such that intensity of the response input signal in the second optical waveguide 250b will be increased to by the coupling of light from the first optical waveguide 250a into the sensor optical waveguide 146.

The first and second optical waveguides 250a, 250b may be arranged such that optical signals traveling in the respective waveguides 250a, 250b may not directly affect each other. Thus, intensity of light in the second optical waveguide 250b may solely depend on the coupling of light into the sensor optical waveguide 146. For instance, the first and second optical waveguides 250a, 250b may be arranged at opposite positions to each other in relation to the sensor optical waveguide 146.

Figure 5:
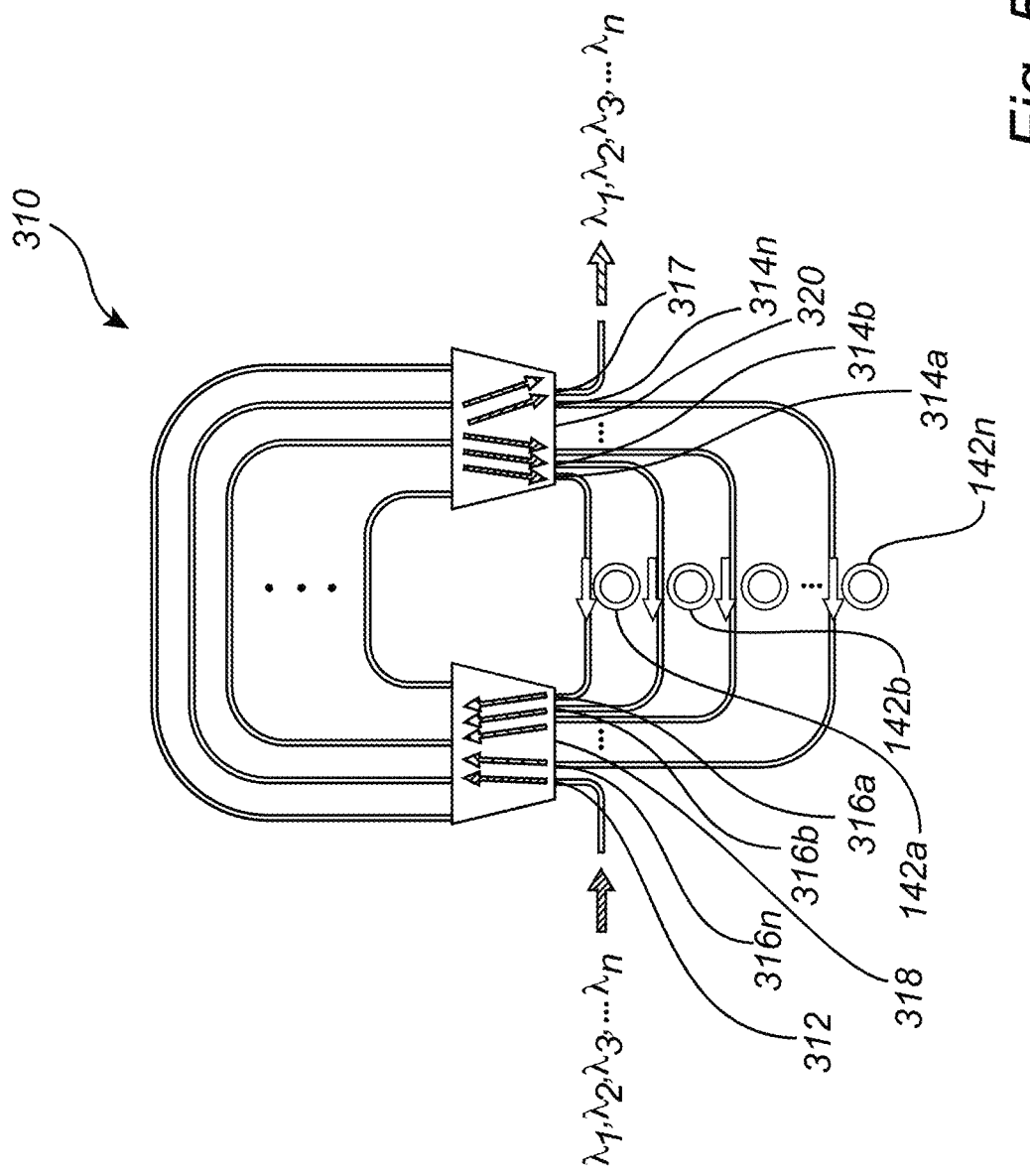
FIG. 5 is a schematic view of the wavelength-splitting/combining component of the integrated photonic device according to a second embodiment.

Referring now to FIG. 5, an AWG 310 according to an embodiment is described. The AWG 310 may be used in any of the embodiments described herein.

The AWG 310 is configured to receive the input signal at a first input port 312 on a first side 318 of the AWG 310. The AWG 310 splits the input signal into a plurality of output signals provided at output ports 314a, 314b, ..., 314n on a second side 320 of the AWG 310.

The plurality of output signals is propagated to sensors 142a, 142b, 142n to form a plurality of response input signals. The response input signals are further propagated to be input at response input ports 316a, 316b, 316n, which are arranged on the first side 318 of the AWG 310. The AWG 310 combines the plurality of response input signals into a combined response output signal provided at a response output port 317 on the second side 320 of the AWG 310.

Figure 6:
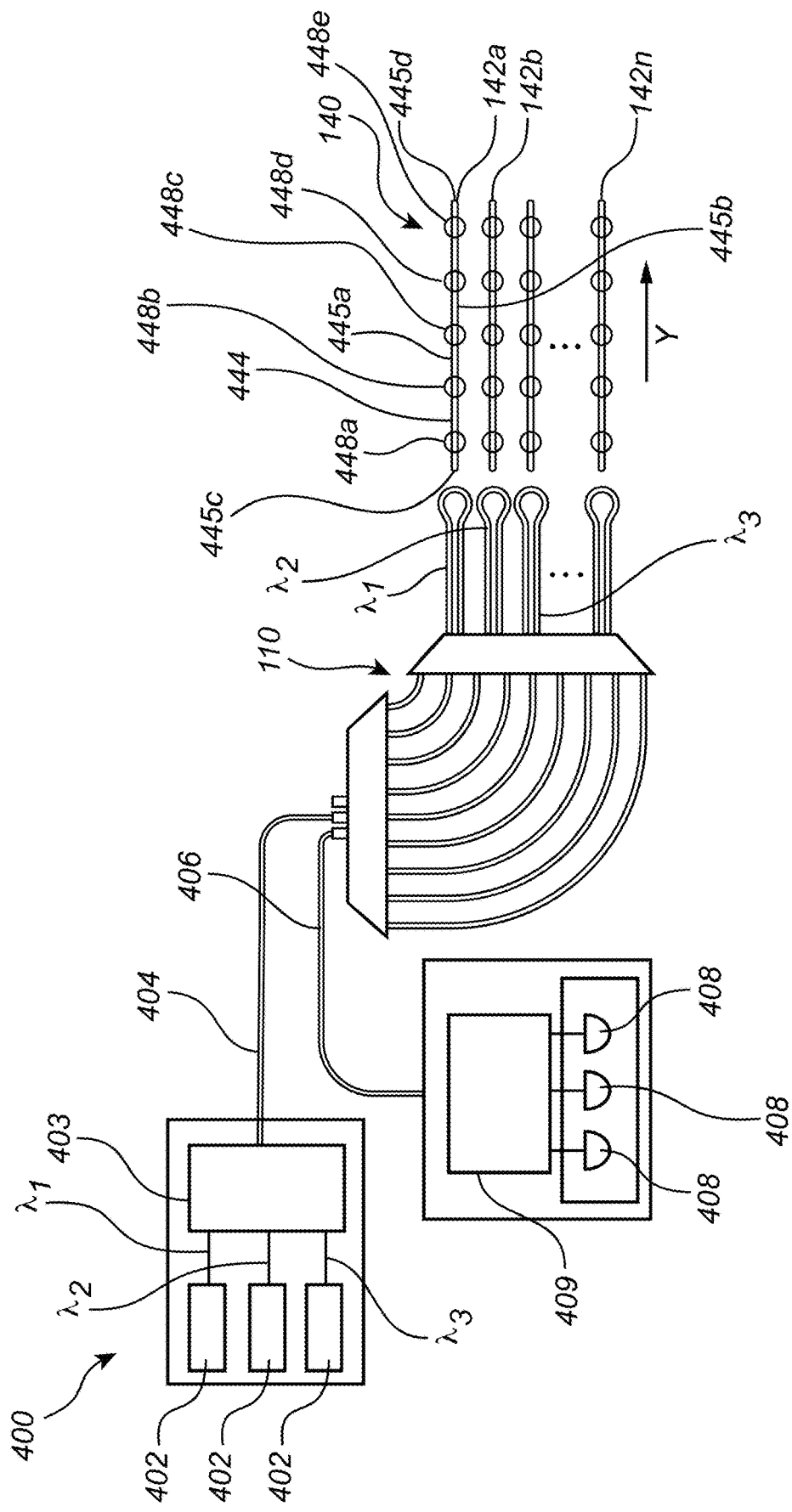
FIG. 6 is a schematic view of a sensor system according to a first embodiment.

Referring now to FIG. 6, a sensor system 400 will be described. The sensor system 400 comprises the integrated photonic device 100 with an arrangement of the AWG according to any of the embodiments discussed above.

The sensor system 400 comprises the array 140 of sensors 142a, 142b, ..., 142n. In the below described embodiment, the array 140 of sensors 142a, 142b, ..., 142n is configured to provide opto-mechanical ultrasound detection. However, it should be realized that the sensor system 400 may comprise sensors configured to detect any other external effect on the sensors.

The sensor system 400 comprises at least one light source 402. The at least one light source 402 is configured to generate light of a plurality of wavelengths. The at least one light source 402 may comprise a plurality of lasers or light-emitting diodes, each configured to output a respective wavelength in the plurality of wavelengths.

The sensor system 400 may further comprise an optical fiber 404 for propagating an input signal comprising light of the plurality of wavelengths to the AWG 110. If a plurality of lasers is used, the sensor system 400 may comprise a multiplexer 403 for combining the plurality of signals from the plurality of lasers into a single input signal.

The input signal may thus be propagated in a single optical fiber 404 to the AWG 110. The AWG 110 may act as a de-multiplexer for splitting the single input signal into a plurality of output signals of different wavelengths, which may correspond to the different wavelengths of the lasers.

FIG. 6 shows an embodiment of a sensor system 400 for an optomechanical sensor for detecting acoustical pressure waves. The sensors 142a, 142b, ..., 142n each comprise an optical waveguide closed-loop resonator 444 and a plurality of individual sensor elements 448a-448e.

The closed-loop resonator 444 may be integrated onto the plurality of sensor elements 448a-448e in a photonic chip. The photonic chip could be a silicon or silicon-nitride photonic chip.

The sensor elements 448a-448e are in the shown embodiment small round membranes arranged in a row so that they together form an elongated sensor area in a Y-direction. It should be understood that the membranes may have any other suitable form, such as quadratic or rectangular.

An elongated sensor area may have a natural acoustical focus in the imaging plane. The plurality of sensing elements 448a-448e forming an elongated sensor area, such as a one-dimensional array (row) of sensor elements, may thus have an acoustical focus in the Y direction. In order to allow for acoustical imaging, e.g. by digital reconstruction based on recordings of a plurality of the sensors 142a, 142b, ..., 142n, the one-dimensional arrays are therefore arranged next to each other in the XY plane (in z=0 plane). The XZ-plane is thus an imaging plane and using recordings of all sensors 142a, 142b, ..., 142n, an image corresponding to features in the XZ-plane may be constructed.

The closed-loop resonator 444 is further arranged at the membranes 448a-448e and is associated with each of the individual membranes 448a-448e. The closed-loop resonator 444 has also an elongated form that extends in the same direction (Y direction) as the row of membranes 448a-448e and the elongated sensor area. In the shown embodiment, the closed-loop resonator 444 has a racetrack shape, comprising two parallel portions 445a, 445b extending along a longitudinal direction of the elongated shape. The two parallel portions 445a, 445b are connected by loops 445c, 445d at ends of the parallel portions. In the shown embodiment, the parallel portions 445a, 445b are arranged at the plurality of sensor elements 448a-448e such that the closed loop resonator 444 is integrated with both parallel portions 445a, 445b in all individual membranes 448a-448e of the plurality of membranes.

An incident acoustic pressure wave affects the strain of the membranes 448a-448e and this in turn causes a shift in the resonance wavelength of the closed-loop resonator 444 as compared to when the membranes 448a-448e are in an undeformed state. Further, the closed-loop resonator 444 is arranged and associated with all of the membranes 448a-448e such that the resonance wavelength of the closed-loop resonator depends on the strain of all sensor elements 448a-448e, i.e. the resonance wavelength of the closed-loop resonator 444 depends on the contributions of the deformation of the all the membranes 448a-448e of the plurality of membranes.

In FIG. 6, only 5 individual membranes 448a-448e are shown for clarity reasons, but the plurality of membranes may be at least 10 membranes arranged in a row.

The AWG 110 provides output signals such that output signals of different wavelengths are propagated to separate sensors 142a, 142b, 142n. The response input signals from the sensors 142a, 142b, ..., 142n are provided at ports of the AWG 110 differing from the ports of the output channels. The AWG 110 further combines the plurality of response input signals into a single response output signal, which may be propagated in a single optical fiber 406 towards a detector 408.

The sensor system 400 thus further comprises at least one detector 408 for detecting wavelength information in the single response output signal. The detector 408 may be configured to detect the wavelength information e.g. by the response output signal being dispersed based on wavelengths towards an array of detectors 408 or that detectors 408 in an array of detectors 408 are associated with unique filters, such that each detector 408 in the array of detectors 408 detects a unique wavelength band in the response output signal.

As shown in FIG. 6, the sensor system 400 may comprise a de-multiplexer 409 which splits the response output signal into a plurality of signals, which are each detected by a separate detector 408.

The detector 408 may be in the form of a photodetector for detecting light, such as a detector 408 configured for detecting the intensity of incident light. The detector 408 may be a photodiode, a photomultiplier, a charge coupled device sensor, a complementary metal-oxide-semiconductor active sensor or any other type of optical detector.

A detection mechanism of the sensor system 400 for detecting a pressure applied to the sensors 142a, 142b, ..., 142n will now be further described.

The wavelength of light of the output signal for each of the sensors 142a, 142b, ..., 142n may be arranged at a flank of a resonance curve of the closed-loop resonator 144. Thus, the output signal may provide a measurement wavelength, which does not correspond exactly to the resonance wavelength of the closed-loop resonator 144 in an undeformed state of the membranes of the plurality of sensor elements 148a-148e.

The resonance wavelength is shifted in dependence of e.g. a change of the geometry of the closed-loop resonator 144 and/or due to a change in material refractive indices. As shown in FIG. 6, a single optical waveguide 150 is used for propagating the output signal from an output port of the AWG 110 to the sensor and back again to a response input port of the AWG 110. Thus, the intensity of the response input signal will be reduced due to coupling of light from the optical waveguide 150 into the closed-loop resonator 144. Hence, a change in the resonance wavelength of the closed-loop resonator 144 will change an amount of light being coupled into the closed-loop resonator 144 and will hence change an intensity of the response input signal.

Since the measurement wavelength is selected to be arranged at a flank of the resonance curve, small changes in resonance wavelength due to acoustical pressure waves deforming the membranes of the plurality of sensor elements 448a-448e will be detected by the detector 408 as changes in optical intensity. Thus, a shift of the resonance curve directly translates into a modulation of the transmitted optical intensity, which is hence used for detecting the acoustical pressure wave. Also, thanks to the measurement wavelength being at a flank of the resonance curve, a shift of the resonance curve in one direction causing the measurement wavelength to be closer to a peak resonance wavelength will cause a decrease in the intensity of the response input signal, whereas a shift of the resonance curve in another direction causing the measurement wavelength to be farther away from a peak resonance wavelength will cause an increase in the intensity of the response input signal.

Figure 7:
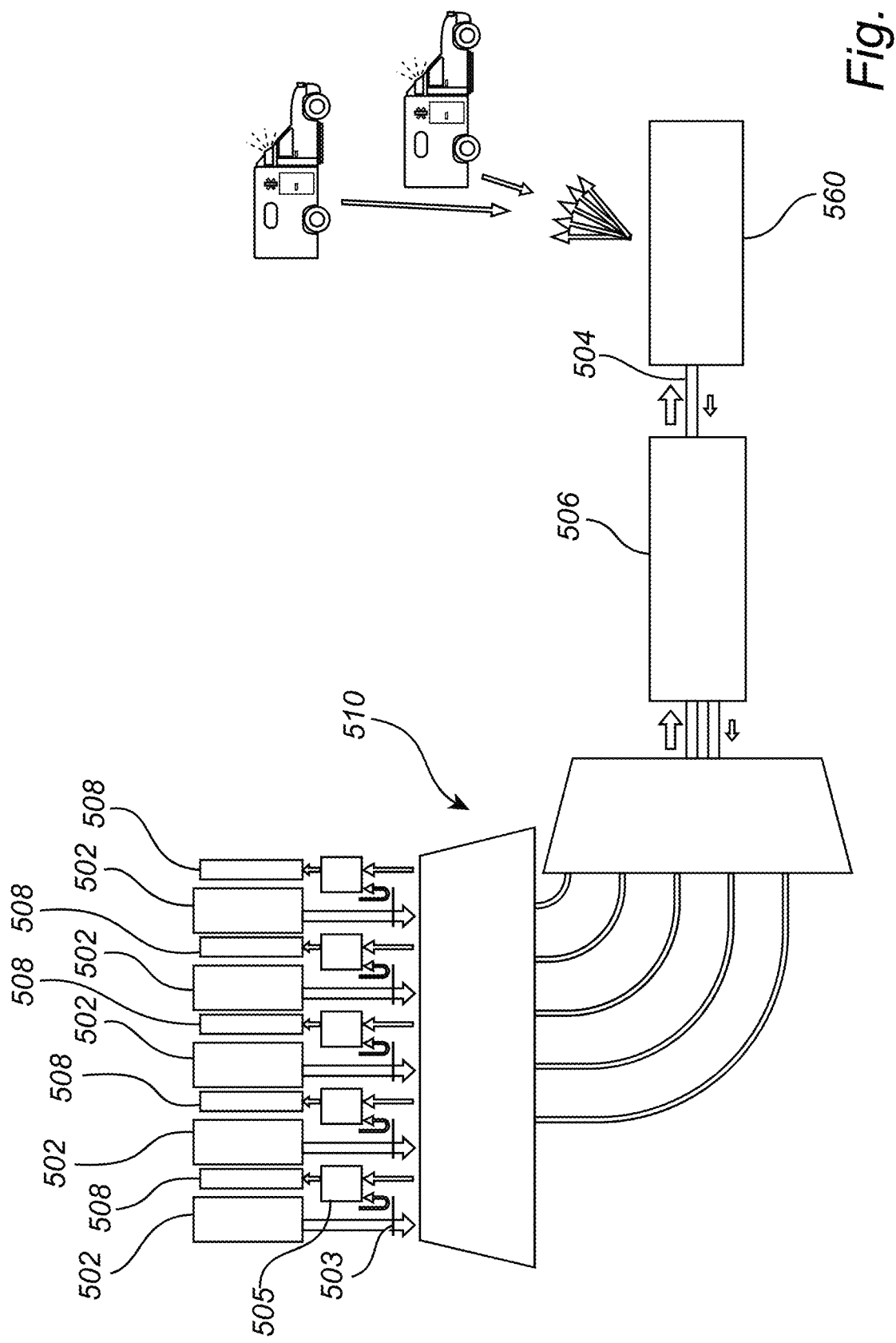
FIG. 7 is a schematic view of a sensor system according to a second embodiment.

Referring now to FIG. 7, a sensor system 500 will be described. The sensor system 500 comprises the integrated photonic device 100 with a wavelength-splitting/combining component, which may be in the form of an AWG 510. It should be realized that other types of wavelength-splitting/combining components may be used.

In the sensor system 500, the AWG 510 has a corresponding functionality as the AWGs described above. However, the AWG 510 is configured in the sensor system 500 to receive a plurality of input signals (instead of a single input signal) so as to form a combined output signal. The combined output signal is used for generating a response input signal, which is again provided to the AWG 510, which splits the response input signal into a plurality of response output signals (instead of a single response output signals).

The sensor system 500 may be used for propagating a single output signal from the AWG 510 to a location at which light interaction is to be induced. Further, a single response input signal may be propagated back to the AWG 510. This may be useful e.g. when light interaction is to be induced at a remote location far away from light sources and detectors, such that a single optical fiber may be used for propagating light to the remote location.

Similar to the above-described embodiments, the AWG 510 has a dual functionality of a multiplexer and a de-multiplexer. The use of the AWG 510 for both purposes ensures that an exact inverse optical functionality is provided for multiplexing and de-multiplexing.

The sensor system 500 comprises at least one light source 502. The at least one light source 502 is configured to generate light of a plurality of wavelengths. The at least one light source 502 may comprise a plurality of lasers or light-emitting diodes, each configured to output a respective wavelength in the plurality of wavelengths. Thanks to using a plurality of light sources 502, a well-controlled wavelength of each of the plurality of wavelengths may be obtained.

Light from the at least one light source 502 is provided as a plurality of input signals, each having a unique wavelength band, into the AWG 510. The AWG 510 is configured to combine the plurality of input signals into a combined output signal. The AWG 510 is further configured to output the combined output signal towards a wavelength-separating and capturing element 560.

The wavelength-separating and capturing element 560 may be a single optical element for separating wavelengths towards a scene and for capturing responses from the scene. Alternatively, separate optical elements may be used, such that one element is dedicated to wavelength separation towards the scene and another element is dedicated to capturing responses from the scene. The wavelength-separating and capturing element 560 may be dispersive beam-forming element(s) for splitting the output signal from the AWG 510 based on wavelengths and for directing beams towards the scene and for combining response signals of different wavelengths from the scene into a single combined response signal.

The wavelength-separating and capturing element 560 may for instance be used for LIDAR measurements, wherein the response from the scene may be used for determining a distance to a target in the scene and/or presence of substances in the scene.

The response captured by the wavelength-separating and capturing element 560 may be transmitted back towards the AWG 510 as a response input signal. The AWG 510 thus receives the response input signal and splits the response input signal into a plurality of response output signals.

The sensor system 500 further comprises at least one detector 508 for detecting wavelength information in the plurality of response output signals. Typically, the sensor system 500 may comprise a plurality of detectors 508, wherein each detector 508 is associated with one of the response output signals from the AWG 510 for detecting the wavelength information therein.

The detector 508 may be in the form of a photodetector for detecting light, such as a detector 508 configured for detecting the intensity of incident light. The detector 508 may be a photodiode, a photomultiplier, a charge coupled device sensor, a complementary metal-oxide-semiconductor active sensor or any other type of optical detector.

According to the embodiment shown in FIG. 7, each light source 502 is associated with a guiding element 503 for guiding part of the generated light directly to a detector 508, enabling mixing of generated light from the light source 508 with light in the single response output signal for frequency-modulated continuous wave (FMCW) detection.

The guiding element 503 ensures that part of the input signal from the light source 502 having a particular wavelength band is provided to the detector 508. Thanks to the use of the AWG 510 as both a multiplexer and a de-multiplexer, it may be ensured that the response input signal in the same particular wavelength band is provided to the detector 508. Thus, according to this embodiment, the input signal is mixed by a mixer 505 with the response output signal for the same wavelength band. This implies that the input signal and the response output signal are related to each other. The use of multiple wavelengths in multiple input signals and response output signals thus enables FMCW detection, which may be used e.g. for determining a distance to a target within the scene.

The guiding element 503 may for instance use a beam-splitting element, such as a beam splitter mirror, for transferring part of a signal towards the AWG 510 and part of the signal towards the detector 508.

As shown in FIG. 7, a single optical fiber 504 may be used at the wavelength-separating and capturing element 560 for providing the output signal from the AWG 510 to the wavelength-splitting and capturing element 560 and for providing the response input signal back from the wavelength-splitting and capturing element 560.

This implies that the output signal and the response input signal are both provided in the same optical fiber 504. In order to separate the output signal from the response input signal, a power distribution device 506 is used. The power distribution device 506 may be arranged close to the AWG 510 in order to ensure that a single optical fiber 504 may be used for a majority of a path between the AWG 510 and the wavelength-separating and capturing element 560.

The power distribution device 506 is configured to separate the output signal from the response input signal, such that the response input signal is provided into the AWG 510 in a response channel, wherein the output channel and the response channel are connected to different ports of the AWG 510. Thus, the power distribution device 506 is configured to receive the output signal from the AWG 510 and forward the output signal to the optical fiber 504 to be output to the wavelength-separating and capturing element 560. The power distribution device 506 is further configured to receive the response input signal from the wavelength-separating and capturing element 560 in the optical fiber 504 and to provide the response input signal towards the AWG 510 in the response channel.

The power distribution device 506 may advantageously be provided as a multimode interferometer, such as a 1×2 multimode interferometer. According to an alternative, a circulator may be used.

According to an alternative embodiment, the sensor system 500 does not comprise any power distribution device 506. Then, the output signal may be propagated from the AWG 510 to the wavelength-separating and capturing element 560 in a first optical fiber, whereas the response input signal may be propagated from the wavelength-separating and capturing element 560 to the AWG 510 in a second optical fiber such that the output signal and the response input signal are separated by being transmitted through different optical fibers.

Figure 8:
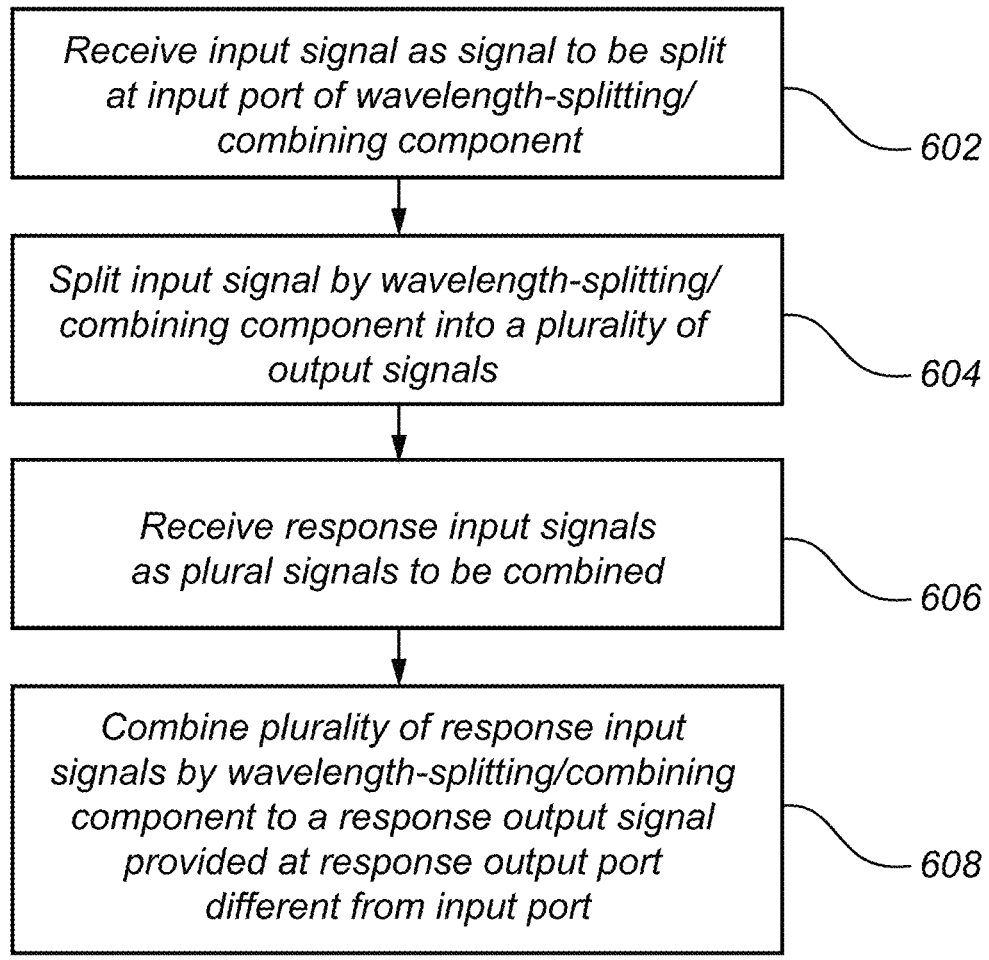
FIG. 8 is a flowchart of a method according to a first embodiment.

Referring now to FIG. 8, a method according to a first embodiment will be briefly described.

The method uses a single wavelength-splitting/combining component for both splitting a single signal to be split, wherein the signal to be split comprises plural wavelengths, to plural split signals, and combining plural signals to be combined to a single combined signal.

The method comprises receiving 602 an input signal as the single signal to be split. The input signal may be received at an input port of the wavelength-splitting/combining component. The input signal may comprise a plurality of wavelengths, e.g. by being formed by a broadband light source or by being formed based on light generated by a plurality of light sources.

The method further comprises splitting 604 the input signal by the wavelength-splitting/combining component to a plurality of output signals in a plurality of output channels. Each output signal is related to a unique wavelength band from the plurality of wavelengths. The output signals may be output at output ports of the wavelength-splitting/combining component and may be guided by waveguides connected to the output ports. The output signals may for instance be guided by the waveguides to sensors in an array of sensors, such that the output signals may be used for interrogating the sensors in the array for read-out of measurements from the sensors. Each output signal may thus induce light interaction which generates a respective response input signal.

The method further comprises receiving 606 response input signals in a plurality of response channels as the plural signals to be combined. Each response channel is configured to receive the response input signal from light interaction induced by a unique output signal. The response input signals are received at response input ports, such that the response input signal of a particular wavelength is received at a response input port that differs from the output port at which the output signal of the particular wavelength is provided.

The method further comprises combining 608 the plurality of response input signals to a single response output signal provided at a response output port. The input port differs from the response output port such that the output channel and the response channel are connected to different ports of the wavelength-splitting/combining component. This implies that the response output signal will not be mixed with the input signal, such that there is no need for any component for separating the response output signal from the input signal.

The method allows generating input light signals and detecting response output signal at location(s) distant from a location where a light interaction that is to be observed occurs. Light may be transferred between the light source/detector and a location of light interaction using single signals having a plurality of wavelengths, such that only two optical fibers may be needed for such light transfer. For instance, this may be very useful in read-out of sensors through a catheter, wherein it is of utmost importance to have a compact system.

Figure 9:
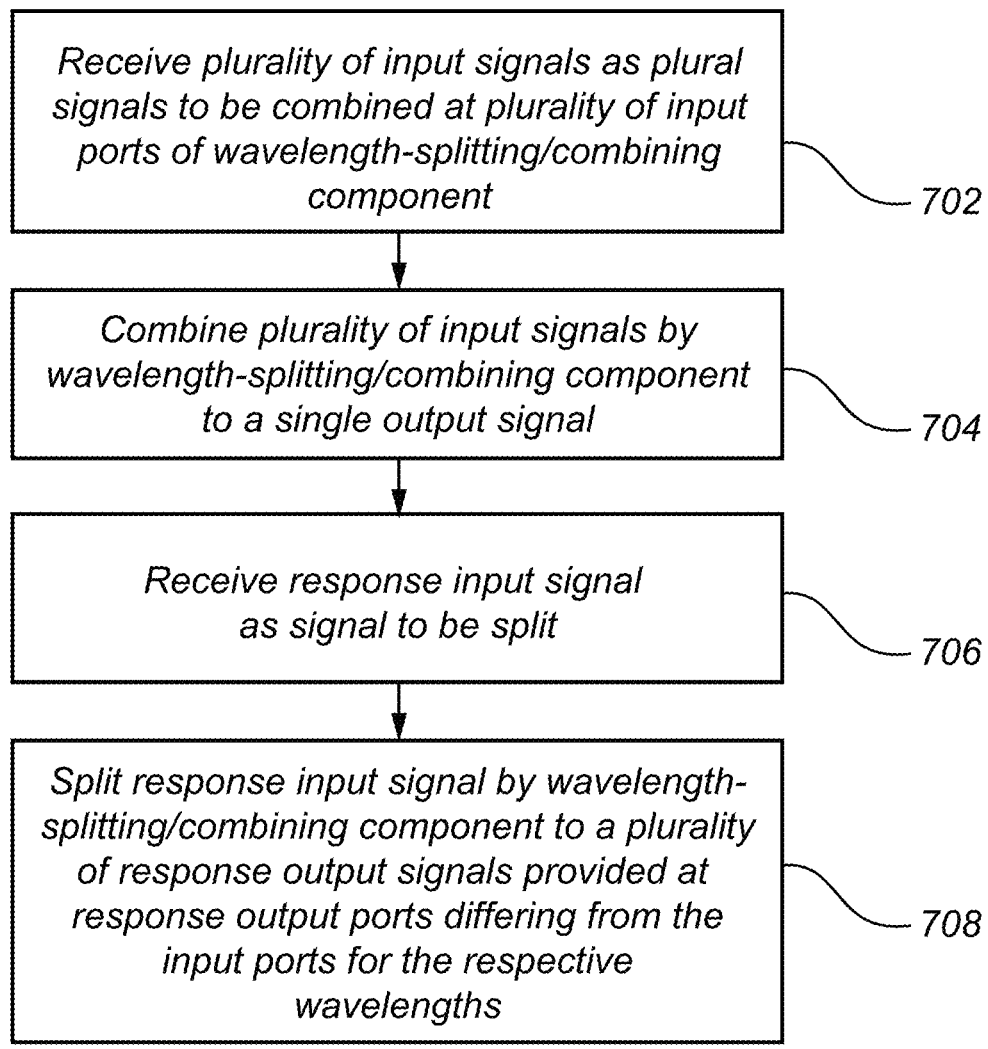
FIG. 9 is a flowchart of a method according to a second embodiment.

Referring now to FIG. 9, a method according to a second embodiment will be briefly described.

The method uses a single wavelength-splitting/combining component for both splitting a single signal to be split, wherein the signal to be split comprises plural wavelengths, to plural split signals, and combining plural signals to be combined to a single combined signal.

The method comprises receiving 702 a plurality of input signals as the plural signals to be combined. The plurality of input signals may be received at a plurality of input ports of the wavelength-splitting/combining component. Each of the input signal is related to a unique wavelength band, e.g. by being generated by a respective light source of a plurality of light sources.

The method further comprises combining 704 the plurality of input signals to a single output signal in an output channel. The output signal is related to a plurality of wavelengths and may be output at an output port of the wavelength-splitting/combining component. The output signal may be guided by a waveguide connected to the output port. The output signals may for instance be guided to a location at which light interaction occurs. The light interaction may capture information about the location at which light interaction occurs such that the light interaction may later be analyzed for extracting the captured information. The output signal may for instance be used by a wavelength-separating and capturing element for dispersing the output signal into plural wavelengths that may be scanned over a scene for analyzing the scene, such as in a LIDAR measurement. The output signal may thus induce light interaction which generates a spectrally resolved response, which may be combined by the wavelength-separating and capturing element into a single response input signal.

The method further comprises receiving 706 a response input signal in a single response channel as the single signal to be split. The response input signal is received at a response input port differing from the output port.

The method further comprises splitting 708 the response input signal to a plurality of response output signals. Each response output signal is related to a unique wavelength band. The input port for receiving an input signal of a particular wavelength differs from the response output port at which the response output signal of the particular wavelength is provided. This implies that the response output signal will not be mixed with the input signal of the same wavelength, such that there is no need for any component for separating the response output signal from the input signal.

The method allows generating input light signals and detecting response output signal at location(s) distant from a location where a light interaction that is to be observed occurs. Light may be transferred between the light source/detector and a location of light interaction using single signals having a plurality of wavelengths, such that only one or two optical fibers may be needed for such light transfer. For instance, this may be very useful in providing light for inducing a light interaction to a remote location or a location at which there is no space for providing light sources and/or detectors. This may for instance be used in LIDAR measurements.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An integrated photonic device for wavelength division multiplexing, said photonic device comprising:
    a wavelength-splitting/combining component having a first side and a second side, wherein the wavelength-splitting/combining component is configured to be re-used for both splitting a single signal to be split, wherein the signal to be split comprises plural wavelengths, to plural split signals, wherein each of the plural split signals is related to a unique wavelength band, and combining plural signals to be combined, wherein each of the plural signals to be combined is related to a unique wavelength band, to a single combined signal, wherein the wavelength-splitting/combining component comprises at least one output channel for providing an output signal and at least one response channel for receiving a response input signal from a light interaction induced by the output signal, wherein the output channel and the response channel are connected to different ports of the wavelength-splitting/combining component, and wherein the component comprises at least one additional channel on either the first side or the second side, which additional channel is dedicated to be used only in splitting the single signal to be split or in combining the plural signals to be combined,
    wherein the wavelength-splitting/combining component is configured to receive an input signal as the single signal to be split and to split the input signal to a plurality of output signals in a plurality of output channels,
    wherein the wavelength-splitting/combining component comprises a plurality of response channels for receiving response input signals as the plural signals to be combined,
    wherein each response channel is configured to receive the response input signal from light interaction induced by a unique output signal,
    wherein different response channels receive response input signals from light interaction induced by different output signals,
    wherein the wavelength-splitting/combining component is configured to combine the plurality of response input signals in the plurality of response channels to a single response output signal,
    wherein an output channel of the plurality of output channels is configured to transfer the output signal to a sensor, and
    wherein a response signal from the sensor based on the output signal is received in a response channel.

2. The integrated photonic device according to claim 1, wherein a waveguide is configured to function as both an output channel and a response channel, such that a first output signal of a first wavelength is provided in the waveguide towards a first sensor and a second response input signal from the first sensor or a second sensor based on the response from a second input signal of a second wavelength is provided in the waveguide back towards the wavelength-splitting/combining component.

3. The integrated photonic device according to claim 2, wherein the wavelength-splitting/combining component is configured to combine a first set of a plurality of response input signals in a first set of a plurality of response channels to a first, single response output signal and a second set of a plurality of response input signals in a second set of a plurality of response channels to a second, single response output signal.

4. The integrated photonic device according to claim 1, wherein the wavelength-splitting/combining component is an arrayed waveguide grating, or an echelle grating.

5. A sensor system, comprising:
    the integrated photonic device according to claim 1;
    at least one light source for generating light of a plurality of wavelengths as the input signal;
    at least one detector for detecting wavelength information in the single response output signal from the wavelength-splitting/combining component; and
    a sensor comprising a sensor optical waveguide, which is configured to be affected by an external effect such that an optical transmission property of the sensor optical waveguide is changed, whereby light interaction induced by the output signal in the output channel is affected such that the response input signal in the response channel is affected.

6. The sensor system according to claim 5, wherein the integrated photonic device and the sensor are configured such that the response input signal corresponds to light passing the sensor once to form a transmission-mode sensor.

7. The sensor system according to claim 6, wherein an optical waveguide has a first portion extending from the wavelength-splitting/combining component to the sensor forming the output channel and a second portion connected to the first portion and extending back from the sensor to the wavelength-splitting/combining component forming the response channel.

8. The sensor system according to claim 5, wherein the sensor is an opto-mechanical ultrasound sensor.

9. A sensor system, comprising:
an integrated photonic device for wavelength division multiplexing, said photonic device comprising: a wavelength-splitting/combining component having a first side and a second side, wherein the wavelength-splitting/combining component is configured to be re-used for both splitting a single signal to be split, wherein the signal to be split comprises plural wavelengths, to plural split signals, wherein each of the plural split signals is related to a unique wavelength band, and combining plural signals to be combined, wherein each of the plural signals to be combined is related to a unique wavelength band, to a single combined signal, wherein the wavelength-splitting/combining component comprises at least one output channel for providing an output signal and at least one response channel for receiving a response input signal from a light interaction induced by the output signal, wherein the output channel and the response channel are connected to different ports of the wavelength-splitting/combining component, and wherein the component comprises at least one additional channel on either the first side or the second side, which additional channel is dedicated to be used only in splitting the single signal to be split or in combining the plural signals to be combined,
wherein the wavelength-splitting/combining component is configured to receive a plurality of input signals as the plural signals to be combined and to combine the plurality of input signals to a single output signal in a single output channel, wherein the wavelength-splitting/combining component comprises a single response channel for receiving a response input signal as the single signal to be split, and wherein the wavelength-splitting/combining component is configured to split the response input signal in the response channel to a plurality of response output signals,
at least one light source for generating light of a plurality of wavelengths as the plurality of input signals;
wavelength-separating and capturing element for separating wavelengths of the output signal for spectral emission towards a scene and for capturing spectral information from the scene, wherein the wavelength-separating and capturing element receives the output signal in the output channel and provides the response input signal of the response channel; and
at least one detector for detecting wavelength information in the plurality of response output signals of the wavelength-splitting/combining component.

10. The sensor system according to claim 9, wherein the sensor system comprises a plurality of light sources, each configured to generate light of a unique wavelength band, and a plurality of detectors, each configured to detect a single response output signal.

11. The sensor system according to claim 10, wherein each light source is associated with a guiding element for guiding part of the generated light directly to a detector, enabling mixing of generated light from the light source with light in the single response output signal for frequency-modulated continuous wave detection.

12. The sensor system according to claim 9, further comprising a power distribution device comprising a multimode interferometer between the wavelength-splitting/combining component and the wavelength-separating and capturing element.

13. A method for wavelength division multiplexing, said method comprising:
using a single wavelength-splitting/combining component for both splitting a single signal to be split, wherein the signal to be split comprises plural wavelengths, to plural split signals, and combining plural signals to be combined to a single combined signal, said method comprising either:
receiving an input signal as the single signal to be split;
splitting the input signal by the wavelength-splitting/combining component to a plurality of output signals in a plurality of output channels, wherein the input signal comprises plural wavelengths and each output signal is related to a unique wavelength band;
transferring the output signal from each output channel to a respective sensor, wherein a response signal from the sensor, based on the output signal, is received in a response channel;
receiving response input signals in a plurality of response channels as the plural signals to be combined, wherein each response channel is configured to receive the response input signal from light interaction induced by a unique output signal, wherein different response channels receive response input signals from light interaction induced by different output signals; and
combining the plurality of response input signals to a single response output signal, wherein each response input signal is related to a unique wavelength band,
or
receiving a plurality of input signals as the plural signals to be combined;
combining the plurality of input signals to a single output signal in an output channel, wherein each input signal is related to a unique wavelength band;
transferring the output signal to a location at which light interaction is induced to generate a spectrally resolved response signal, wherein the response signal, based on the output signal, is received in a response channel;
receiving a response input signal in a single response channel as the single signal to be split, wherein the response channel is configured to receive the response input signal from light interaction induced by the single output signal; and
splitting the response input signal to a plurality of response output signals, wherein the response input signal comprises plural wavelengths and each response output signal is related to a unique wavelength band,
wherein the output channel and the response channel are connected to different ports of the wavelength-splitting/combining component.

* * * * *